US006256038B1

(12) United States Patent
Krishnamurthy

(10) Patent No.: US 6,256,038 B1
(45) Date of Patent: Jul. 3, 2001

(54) PARAMETERIZED SURFACE FITTING TECHNIQUE HAVING INDEPENDENT CONTROL OF FITTING AND PARAMETERIZATION

(75) Inventor: Venkat Krishnamurthy, Mountain View, CA (US)

(73) Assignees: The Board of Trustees of the Leland Stanford Junior University, Palo Alto; Paraform, Inc., Santa Clara, both of CA (US)

( * ) Notice: Subject to any disclaimer, the term of this patent is extended or adjusted under 35 U.S.C. 154(b) by 0 days.

(21) Appl. No.: 09/209,636

(22) Filed: Dec. 10, 1998

(51) Int. Cl.$^7$ .................................................. G06T 15/00
(52) U.S. Cl. .......................................... 345/419; 345/430
(58) Field of Search .................................... 345/418, 419, 345/423, 424, 425, 428, 429, 430

(56) References Cited

U.S. PATENT DOCUMENTS 5,988,862 * 11/1999 Kacyra et al. ........................ 382/195
6,037,949 * 3/2000 DeRose et al. ...................... 345/430

OTHER PUBLICATIONS

Krishnamurthy, V., et al., Fitting Smooth Surfaces to Dense Polygon Meshes, Computer Graphics Proceedings, Annual Conference Series, pp. 313–324, 1996.
Milroy, M., et al., Segmentation of a Wrap–Around Model Using an Active Contour, Computer Aided Design, vol.29, No.4, pp. 299–319, 1997.
Rogers, D. et al., Constrained B–Spline Curve and Surface Fitting, CAGD, 21(10), pp.641–648, 1989.
Milroy, M. et al., G1 Continuity of B–Spline surface patches in reverse engineering, Computer Aided Design, 27(6), pp. 471–478, 1995.
Forsey, D., et al., Surface Fitting with Hierarchical Splines, Computer Science Department, University of Waterloo–Ontario, Canada, pp. 1–20, 1994.
Eck, M., et al., Automatic Reconstruction of B–Spline Surfaces of Arbitrary Topological Type, Computer Graphics Proceedings, Annual Conference Series, pp. 325–334, 1996.
Sinha, S., et al., Single Valuedness, Parameterization and Approximating 3D Surfaces Using B–Splines, SPIE, vol. 2031, Geo. Methods in Comp. Vision II, pp. 193–204, 1993.
Ma, W., et al., Parameterization of Randomly measured points for least squares fitting of B–Spline Curves and Surfaces, Computer Aided Design, 27(9), pp. 663, 675, 1995.

* cited by examiner

*Primary Examiner*—Cliff N. Vo
(74) *Attorney, Agent, or Firm*—Lumens Intellectual Property Services, Inc.

(57) ABSTRACT

A method for creating a smooth parameterization and fitting it to an input surface in a 3-D computer graphics system comprises specifying a plurality of boundary curves on the surface that define a patch of the surface. The boundary curves are typically specified using a user-interactive curve editing procedure, but may also be specified automatically. The method then automatically generates a parameterization of the patch such that a discretized higher order energy functional defined on the surface is minimized. The method further comprises the step of fitting a smooth surface to the input surface, where the smooth surface has a parameterization as generated in the previous step. The fitting and parameterization steps are independently controlled to give the user a high degree of flexibility and control over both steps. The method is useful for converting dense irregular polygon meshes into surface models suitable for interactive modification and animation.

20 Claims, 12 Drawing Sheets

PARAMETERIZED SURFACE FITTING TECHNIQUE HAVING INDEPENDENT CONTROL OF FITTING AND PARAMETERIZATION

This invention was supported by the National Science Foundation under contract number CCR-9157767. The U.S. Government has certain rights in the invention.

BACKGROUND

Recent developments in the field of computer aided modeling enable designers to manipulate representations of physical objects that have been scanned into a computer using lasers. The representation is often a two-dimensional (2-D) surface (i.e., a 2-dimensional manifold) embedded in three-dimensional (3-D) Euclidean space. The surface is constructed by collecting laser range information from various viewing angles and combining it to reconstruct the surface of the object. Initially, this surface is represented in unparameterized form. For example, a common unparameterized surface representation is a dense, seamless polygon mesh, i.e., a collection of polygons joined at their edges. This polygon mesh model of the physical object often then forms the basis for subsequent manipulation and animation. A typical model generated from 75 scans of a physical object using a laser range scanner might contain on the order of 350,000 polygons.

Dense polygon meshes are an adequate representation for some applications such as stereolithographic manufacturing or computer renderings. However, for a number of other application domains, smooth, parameterized surface representations are required in order to permit useful editing and manipulation of the surface. By smooth or parameterized surfaces we mean surfaces whose mathematical representation has a higher order mathematical property such as the existence of a global analytical derivative. In contrast to smooth surface representations, polygonal meshes are just a set of connected planar facets; they do not posses an analytical derivative.

Smooth surface representations offer useful advantages over an irregular polygonal mesh representation. Some of these advantages are:

Smooth appearance: Several applications such as consumer product design require for aesthetic reasons that 3-D surface models possess a smooth appearance. Polygonal meshes cannot be used in these applications because they may appear faceted (unless the polygons are made extremely small, which increases the expense of processing and storing the model).

Compact representation: A smooth surface representation can usually represent complex surface shapes more efficiently than polygonal meshes.

Flexible control: Smooth surface representations usually offer an easier interface to design, control and modify surface geometry and texture.

Mathematical differentiability: Several applications use computational procedures that require the surface to be everywhere differentiable or curvature continuous (e.g., finite element analysis). For such applications, polygonal meshes cannot be used because they are merely piecewise linear surfaces.

Manufacturability: Some manufacturing procedures such as CNC milling require a smooth surface representation to create high quality results.

Hierarchical modeling: Creating manipulable hierarchies from smooth surfaces is a significantly simpler task than doing the same with dense, irregular, polygonal meshes.

Examples of smooth surfaces include parametric representations such as NURBS, B-spline and Bezier surfaces, implicit representations such as spheres and cylinders, algebraic representations based on explicit equations, and so on. To satisfy users that prefer or require smooth surface representations, techniques are needed for creating and fitting smooth surfaces to dense polygonal meshes.

Known techniques for creating and fitting smooth surfaces to polygon meshes, however, consist of a single-step parameterized fit that creates a fixed "ideal" parameterization with a fixed "ideal" surface approximation having that parameterization. Because the parameterization and fit are created simultaneously in one step, the user has limited control over the properties of the parameterization and the properties of the fit. Since having flexibility and control over surface parameterization and fit is crucial for most applications, improved and more flexible techniques for fitting smooth surfaces to polygon meshes are needed.

SUMMARY

In view of the above, it is a primary object of the present invention to provide a method for interactively creating and modifying a parameterization of a surface independent of surface fitting. In particular, it is an object of the invention to provide such a method that allows the user to intuitively and quickly construct parameterizations that are suited to the surface contours of an underlying surface.

In one aspect of the invention, a computer-implemented method is provided for creating a smooth parameterization of an input surface and fitting the parameterization to the surface. The input surface could either be previously unparameterized or it could be parameterized in a manner that is not suitable for its intended use. Typically, the input surface is an unparameterized polygon mesh representation of a 2-dimensional manifold embedded in a 3-dimensional ambient space. In any case, the surface must at least permit a positional adjacency structure to be defined locally at each point where the parameterization is to take place. The method comprises dividing the input surface into patches. Typically this involves specifying a plurality of boundary curves on the surface, where the boundary curves define a patch of the surface. The boundary curves may be specified automatically from the input surface, or may be specified from user-interactive input.

The method further includes automatically generating a parameterization of the patch. The parameterization can be represented as a mapping M into $\mathbb{R}^3$ from a parameter space region I in $\mathbb{R}^2$ such that the image surface M(I) substantially coincides with the surface patch. The parameterization is selected to minimize a discretized higher order energy functional defined on the surface. In a preferred embodiment of the invention, the iso-curves of the parameterization are interpolated between the boundary curves and define an array of sub-patches, and the sub-patches are subjected to predetermined criteria that propagate across iso-curves, e.g., arc length uniformity, aspect ratio uniformity, and parametric fairness criteria. In addition, the parameterization is preferably performed such that the discretized higher order energy functional is minimized subject to the constraint that iso-curves of the parameterization are attracted to follow a user-defined feature curve on the surface.

The method further includes the step of fitting to the patch a smooth surface derived from the generated parameterization. The smooth surface may be represented as a mapping M' into $\mathbb{R}^3$ from the parameter space region I in $\mathbb{R}^2$ such that the image surface M'(I) approximately fits the surface patch.

The smooth surface has a parameterization corresponding to the generated parameterization, i.e., the parameterization of M' substantially coincides with the parameterization of M. Significantly, the processes of generating the parameterizations and fitting smooth surfaces to the surface are independently controlled, thereby providing the user with a high degree of flexibility. In particular, the independent control of fitting and parameterization provides the user with a high degree of flexibility and control in the process. An especially advantageous technique in the preferred embodiment is the provision for both global and local control of the fidelity of the smooth surface fit to the underlying surface patch. Various other important advantages of the invention will become apparent below in the course of the detailed description of exemplary embodiments of the invention.

Some uses of our hybrid parameterization and fitting technique are as follows.

SURFACE FITTING TO SCANNED DATA WITH INDEPENDENT CONTROL OF PARAMETERIZATION AND FITTING

An important application of this invention is creating smooth, controlled parameterizations of scanned data for purposes of fitting higher order surfaces to scanned data. The scanning technique used to acquire the data could be based on any of a number of paradigms that are used to generate polygonal meshes, e.g., lasers, white light, and photogrammetry. Some benefits of fitting smooth surfaces to scanned data are enumerated in the previous section. In contrast with previous approaches to surface fitting, the present invention advantageously separates the surface fitting process into two distinct and independently controlled steps:

1. Controlled parameterization
2. Controlled surface approximation based on the parameterization Previous techniques combine both these steps into one step that consists of creating a fixed "ideal" parameterization and a fixed "ideal" surface approximation based on the parameterization. As a result the user does not have enough control over each individual step in the process. In contrast, our methods allow for fine control over both the parameterization step as well as the approximation step of the surface fitting process. Since the two steps are separately controlled, the user can generate several possible parameterizations for the same approximated shape. The user can also create several approximations to the surface wherein the surfaces have very similar parameterizations. In other words, our surface fitting strategy solves separately for patch parameterization and for patch geometry. In this strategy the geometry is always an approximation to the polygonal mesh. However, the parameterization of the patch can be arbitrary. The fidelity of the spring mesh to the original polygonal geometry is controlled independently of the particular parameterization of the data.

Controlling Surface Parameterization

The independently controllable design of a surface's parameterization is of critical importance to most modelers because it influences several important properties of the surface. For example, surface parameterizations determine the flow of a texture map over the surface. A surface that is not parameterized according to the users specifications is unlikely to appear satisfactory when texture mapped. Surface parameterizations also determine the precise changes in surface geometry when a control vertex of the surface is moved in space to a new location. An unsatisfactorily parameterized surface will usually deform in an unexpected (i.e., undesirable) fashion when a control vertex is moved. For these and other reasons having control over surface parameterization is crucial for most applications.

In another aspect of the present invention, our parameterization strategy gives the user a flexible method to design parameterizations, an ability that previous literature does not address. In our system, the user can specify a number of constraints to the parameterization, called feature curves, and the algorithm interpolates or approximates these constraints during the coarse-to-fine parameterization process. Typically, a user specifies just those feature curves that are important to a parameterization. However, in general the user can specify an arbitrary number of feature curves. As a result, patch parameterizations can be constrained by users to whatever degree is useful. In short, feature curves enable the user to easily create the customized parameterizations required by many applications.

The parameterizations are controlled by feature curves that rigidly or loosely guide the parameterization to follow features of the surface. Feature curves that loosely guide the parameterization are referred to as flow curves to distinguish them from feature curves that rigidly guide the parameterization. In addition, the feature curves used to guide the parameterizations may be user-defined or automatically generated. In summary, a feature curve may be characterized as belonging to one of the following types.

1. Feature curve that rigidly guides the parameterization (feature curves)
2. Feature curve that loosely guides the parameterization (flow curves)
3. User-defined feature curve
4. Automatically generated feature curve Controlling Surface Approximation The user can also generate for any given parameterization several possible surface approximations. The approximations could vary based on several controllable criteria:

1. Output surface type
2. User defined fidelity of the approximation to the entire parameterized data set (global fidelity)
3. User defined fidelity of the approximation within specific regions of the surface (local fidelity)
4. Automatic setting of global fidelity
5. Automatic setting of local fidelity This separation of surface parameterization and surface approximation gives the user valuable fine-grain control over the entire process of surface fitting. For example, in many cases there might either be defects in the original object or in the scan of the object (i.e., the unstructured polygonal mesh). These defects might take the form of:

1. Noise distributed over the entire surface of the mesh.
2. Local blemishes such as pittings or undesirable creases in specific areas of the mesh.

In such cases, providing the user with local and global control over fidelity of the approximation to underlying data is a useful and powerful paradigm for surface approximation. In our system the user can select regions of the unstructured polygonal mesh and assign fidelity values to the regions. When the polygonal mesh is being approximated, these fidelity values determine how closely the parametric surface approximates the unstructured polygonal mesh. Region selection can be user controlled or it can be automatically determined. Similarly, fidelity values for selected regions can be user controlled or automatically determined.

Finally, because our parameterization and approximation steps are independently controlled the user is able to interactively change the parameters of the approximating function itself. For example, once the parameterization of the surface is created the user can change the order of the parametric basis function, or the function itself (e.g., Bezier, B-spline, Catmull-Rom, etc.).

CNC MILLING

Another useful application of this invention is in the generation of tool-paths for computer controlled milling.

When milling an unparameterized surface, machine toolpaths are usually extracted by slicing the object along a series of axis aligned planes. Each slice through the object is then reduced to a set of continuous milling paths. This method is general and can be applied to any input surface. However, it can generate inefficient toolpaths since it assumes no knowledge of the shape or the parameterization of the surface. The controllable parameterizations generated by our technique can be used to generate more efficient milling toolpaths for such surfaces. In addition, because the user has a fine degree of control over the fidelity of the surface approximation to the scanned data set, the user also has a fine degree of control over the toolpaths that are generated for the surface.

When milling a parameterized surface such as a B-spline or Bezier surface, machine toolpaths typically follow the existing parameterization of the surface. However, in many cases the existing parameterization of the surface might not be optimal for milling purposes. In these cases our techniques could be used to generate parameterizations that result in more optimal machine toolpaths. Furthermore, the surfaces may have some undesirable characteristics from a milling perspective. In these cases our ability to precisely control fidelity to the surface can be used to exclude these undesirable characteristics.

FINITE ELEMENT ANALYSIS

Finite element analysis (FEA) of surfaces requires a specific structure of elements that constitute the surface. An example of the kinds of computations performed using FEA include computing stresses and strains of surfaces under different kinds of loads, computing the gradient of fluid flow at various points along the surface, etc. Since our parameterization technique is controllable it can be used to generate the precise surface structure needed for FEA. Furthermore, our methods for controlling fidelity to the surface can be used to selectively mask regions of the surface that are not needed for FEA.

TEXTURE MAPPING

Many techniques for texture mapping require parameterized surfaces. Our invention can be used to create controlled, usable parameterizations for input surfaces that are either not parameterized or parameterized inappropriately for purposes of texture mapping.

SURFACE MODELING AND MODIFICATION

The design of 3-D parametric surfaces usually has two key components: first, the design of the geometry of the surface, and second, the design of its parameterization. It is important to note that in general these are two separate activities even though commercial modeling packages such as Alias or Pro/Engineer use modeling paradigms (such as lofting or skinning) that treat them as a unified activity. This is often constraining to the user.

The invention described here enables a new modeling paradigm: the user can use alternate surface modeling paradigms that make use of implicit (e.g., spheres, cylinders, volumes, algebraic) surfaces, explicit (e.g., parametric) surfaces, or procedural modeling techniques to create the surface geometry without any parameterization constraints. This enables the user to model in a much more free-flowing and expressive manner. Using our invention the user can create a controlled parameterization of the surface depending on the desired use of the surface. The user can subsequently control the final shape of the surface at a greater degree of detail using our methods for controlling fidelity to underlying data, e.g., by smoothing out imperfections in the free-flowing modeling process.

As the previous list of applications shows, the input surface could originate from a variety of sources. The only constraint on our input surfaces is that they have the properties of 2-dimensional manifolds. In our applications they are usually embedded in 3-dimensional space. However, this is not a necessary constraint on the surface representation. One example of an input surface is scanned 3-dimensional data. In this case the input is a dense, unparameterized polygonal mesh; the user must parameterize the polygonal mesh in order to create higher order surfaces such as NURBS or B-splines. Another example is a surface which has previously been parameterized but must be re-parameterized differently in order to be useful within specific applications.

Our parameterization technique is based on a coarse-to-fine algorithm that is automatic, efficient, and robust, even for very complex surfaces. Prior algorithms have lacked one or more of these properties, making them unusable for large surfaces (e.g., polygonal meshes with hundreds of thousands of polygons). We also demonstrate that our parameterizations are of a higher quality than prior approaches.

The parameterization and surface fitting approach described herein provides robust, automated and customizable parameterization and approximation algorithms that are well suited for use in an interactive system.

Our parameterization algorithm is based on a coarse-to-fine relaxation strategy that generates a minimum distortion surface grid called the spring mesh. The coarse-to-fine nature of our strategy allows a user to incrementally preview even large patch configurations. This is a useful property for an interactive system. In particular, it proves invaluable when modelers wish to experiment with different patch configurations for the same model.

Our fitting (or approximation) algorithm works in two steps. In the first step, a new approximation-spring-mesh is first derived from the spring mesh. The approximation-spring-mesh (or simply: approximation-mesh) is a copy of the spring mesh that has been modified to take into account the desired fidelity of approximation. We start by creating an approximation-mesh that is a copy of the spring mesh. The approximation-mesh points are now allowed to move off the surface of the spring mesh to an extent that is determined by the extent of fidelity required in that region of the underlying polygonal mesh. This creates an approximation-spring-mesh that stays close to the polygonal mesh surface at "high-fidelity regions" and potentially deviates substantially from the mesh surface at "low-fidelity regions". This step may be performed either during the coarse-to-fine relaxation process or as a post-process to that step. Within the context of our system we perform it as a post-processing step to the parameterization process. Our reason for performing this as a post-process is that it simplifies the user interface to the surface approximation process, and does not affect the complexity of our algorithm.

The second step of the fitting process is to perform a least squares operation on the approximation spring mesh to generate the smooth surface approximation. Note that the least squares fitting process itself creates an approximation to the approximation-mesh. In this sense the additional step of creating an approximation-mesh might seem redundant (i.e., why not subsume the first step within the mathematical least squares fitting process). However, the additional step of creating an approximation-spring-mesh provides the user with interactive and fine-grain control over the final surface that is generated by the approximation process. This kind of control is not achievable using a single step least squares approximation to the original spring mesh.

A computationally efficient implementation of our parameterization strategy is provided that, on the average, works in O(N log N) time in the size of a polygonal patch. In principle this implementation can be improved to work in O(N) time simply by substituting a linear time shortest path algorithm into our initialization step. A linear time (O(N)) algorithm is provided for the surface approximation step of the algorithm. The only other automated parameterization scheme to date that works on polygonal meshes runs in $O(N^2)$ time and produces no incremental results; consequently, it is not a viable alternative for use in an interactive setting. Other prior art approaches to the parameterization problem have similarly lacked the efficiency or robustness (or both) required to successfully parameterize dense polygonal data sets.

BRIEF DESCRIPTION OF THE DRAWING FIGURES

Figure 17A:
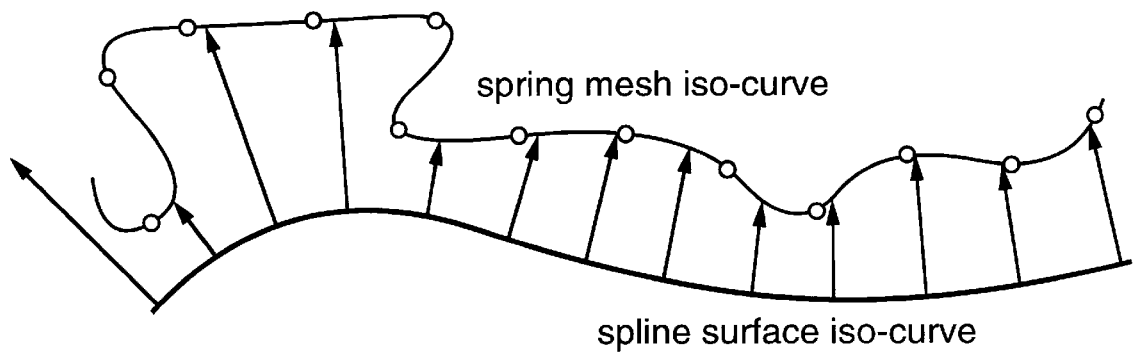
Figure 17B:
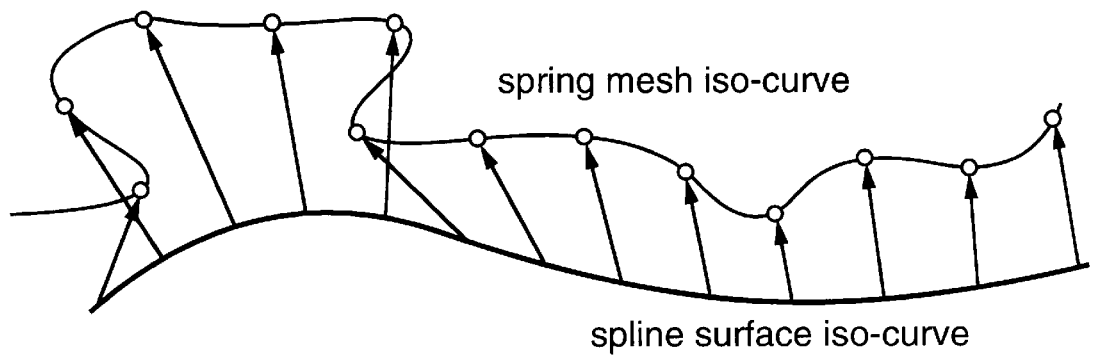

FIGS. 17A–B illustrate the contrast between scalar displacement maps and vector displacement maps.

DETAILED DESCRIPTION

In the following description we explain the details of a parameterization and fitting algorithm according to the present invention.

DEFINITIONS

Throughout this document, we define a surface to be a 2-dimensional manifold and an unparameterized surface to be a 2-dimensional manifold without any smooth global parameterization. A polygon mesh is an example of an unparameterized surface because no single differentiable formula can be used to define it globally. We define a polygon mesh or polygon surface to be a 2-dimensional manifold represented as a union of polygons. Typically, the polygons and the polygon surface are represented as 2-manifolds embedded in 3-D Euclidean space. For example, a polygon mesh may be represented as a set of points (called vertices) in 3-D Euclidean space, together with a set of faces (groups of 3 or more vertices that share a common face), a set of edges (groups of 2 vertices that share an edge), and an adjacency structure that can be used to easily determine which vertices, edges, and faces are adjacent to any given vertex, edge, or face. A surface curve on a surface is defined to be a 1-dimensional manifold embedded in a 2-D manifold (the surface). A face-point curve is a surface curve defined by a sequence of connected face points, where a face point is simply a point on some face of a polygonal surface. A face-point curve may be represented, for example, by a sequence of points embedded in 3-D Euclidean space, where each point is contained in a face of the polygon mesh. A feature curve is a surface curve that rigidly or loosely guides a parameterization. A feature curve that loosely guides the parameterization is referred to as aflow curve to distinguish it from a feature curve that rigidly guides the parameterization. Feature curves may be user-defined or automatically generated.

PROBLEM CHARACTERISTICS

A significant characteristic of our parameterization and surface fitting method results from the insight that there is usually a non-automatable, creative component intrinsic to the process of parameterization as well as smooth surface creation. Some examples of non-automatable components of the process include:

Placement of patch boundary curves. While it is possible using existing techniques to automatically generate these curves on the polygon mesh, we have found that for most applications manual placement of patch boundaries is preferable.

Placement of feature curves. Once again the placement of these curves could be automated based on surface properties such as gaussian curvature or curvature gradient. However, we have found that for most applications manual placement of feature curves is preferable.

Selection of local or global fidelity of a smooth surface approximation to the polygonal surface is best done by a user.

This non-automatable nature of the parameterization and surface approximation process has three implications for our implementation:

1. A completely automated surface fitting algorithm is not acceptable.
2. A good solution should provide efficient and intuitive tools to the user to provide the creative input required.
3. A good solution should provide real-time feedback at every stage of the surface fitting process to provide the user as much control as is needed over the final solution.

OVERVIEW OF SYSTEM PIPELINE

Implementations of the present invention typically operate in the context of a system pipeline. In order to appreciate and understand the significance of the present invention, this pipeline will now be briefly described in the case of the preferred embodiment. A surface fitting pipeline accepts as its input a dense polygon mesh and creates as its output a hybrid of B-spline surfaces patches and associated displacement maps. The steps of the system pipeline are as follows.

1. In the first step, boundary curves are interactively or automatically specified on the input surface of the unparameterized polygonal model to define the boundaries of a number of spline patches. The output of this step is a set of bounded mesh regions that we call polygonal patches. In this step, the user can also (optionally) specify one or more feature curves per polygonal patch (see step 2 below). These feature curves serve as constraints to the second (parameterization) stage of our pipeline. The user can also (optionally) select one or more regions of the mesh and assign fidelity values to them. Fidelity values range from 0 to 1 where a fidelity value of 1 implies that the surface approximation will stay as faithful as possible the underlying mesh, while a fidelity value of 0 implies that the approximation will essentially ignore the surface. By default the entire surface is fit with a fidelity value of 1. Note that fidelity values may be automatically assigned as well but we have chosen to let the user control this process within our system.

2. In the second step, for each polygonal patch we perform an automated resampling of the polygonal patch to form a regular grid that lies on the surface of the polygonal patch. This is accomplished by an automatic coarse-to-fine resampling of the patch, producing a regular grid that is constrained to lie on the polygonal surface. We call this regular grid a spring mesh. Our resampling algorithm is a combination of relaxation and subdivision steps that iteratively refine the spring mesh at a given resolution to obtain a better sampling of the underlying polygonal patch. The user can supply a set of constraints called feature curves to further guide the structure of the spring mesh. These curves may be edited using the same set of tools used for editing boundary curves. In cases where feature curves are specified, the parameterization is further constrained to interpolate or approximate them.

Techniques for using feature curves to constrain parameterization are an important aspect of the present invention, as will be seen in the description that follows. The output of this step is a set of spring meshes to which surfaces will now be fit. The original polygon mesh is no longer needed and may be discarded. In this step the spring mesh points always stay on the surface of the original polygonal mesh.

3. In the third step, we create an approximation-spring-mesh from the spring mesh created by the parameterization step. The approximation-spring-mesh starts off as a copy of the original spring mesh (i.e., it is identical in structure and co-located with the spring mesh). We then allow points of the approximation-spring-mesh to move off the spring mesh surface according to fidelity values that were assigned to the underlying polygonal mesh vertices. In our implementation the points of the approximation mesh can only move in a direction that is normal to that of the spring mesh surface. For those regions of the polygonal mesh where the fidelity is less than 1 (i.e., where the user does not want the approximation-mesh surface to follow the spring mesh accurately) the spring mesh points are allowed to leave the surface. The fidelity value is used to modulate the distance that individual approximation-mesh- points move off the spring mesh surface.

4. In the fourth step, we fit surfaces to the approximation-mesh and output both a B-spline surface representation and a set of associated displacement maps to capture the fine detail. In particular, we use gridded data fitting techniques to fit a B-spline surface to the approximation-mesh corresponding to each polygonal patch. The output of this step is a set of B-spline patches representing the coarse geometry of the polygonal model. To represent fine detail, we also compute a displacement map for each patch as a resampling of the difference between the spring mesh and the B-spline surface. This regular sampling can conveniently be represented as a vector (rgb) image which stores a 3-valued displacement at each sample location. Each of these displacements represents a perturbation in the local coordinate frame of the spline surface. This image representation lends itself to a variety of interesting image processing operations such as compositing, painting, edge detection, and compression. An issue in our technique, or in any technique for fitting multiple patches to data, is ensuring continuity between the patches. We use a combination of knot line matching and a stitching post-process which together give us $C^1$ continuity everywhere.

OVERVIEW OF PARAMETRIC SURFACE APPROXIMATION

In a preferred embodiment of the present invention, we approximate our dense polygonal meshes with a network of tensor product B-spline surface patches and associated displacement maps. Each region of the polygonal mesh that must be approximated by our hybrid surface representation is bounded by a set of four boundary curves. These curves lie on the polygonal surface, but they need not align with the vertices and edges of the mesh. We call each such four-sided section of the polygonal mesh a polygonal patch. As explained earlier, the placement of the boundaries of these B-spline surface patches is typically part of the user's creative process and is not normally automatable. Therefore, in the first step of our approximation process the user provides a set of boundary curves as an input. These curves are specified using interactive curve painting tools. Our surface approximation problem now reduces to the following simpler problem: Given a polygonal patch, find a combination of uniform tensor product B-spline surface and displacement map that best approximates this polygonal patch. As can be inferred from the broad scope of this problem statement, there is no single definitive strategy for the general approximation problem.

CHARACTERISTICS OF OUR PARAMETERIZATION AND SURFACE FITTING PROBLEM

Characteristics of the Input Data

Note that while our polygonal meshes have arbitrary global topology, each individual polygonal patch is itself u-v parameterizable, i.e., it is some arbitrary manifold deformation of a planar surface. We do not make any other assumptions about the topology or the geometry of a polygonal patch. In particular, polygonal patches are not restricted to be height fields. Note that our input meshes are usually neither sparse nor noisy and therefore any desirable solution to our fitting problem should avoid smoothing out the approximating B-spline surfaces using regularizing terms. However, the original object might have had specific undesirable defects such as irregularities, pittings, cracks and other artifacts due to wear and tear (or incomplete fabrication). In these cases, the user should be able to eliminate such artifacts. While our input meshes are usually neither sparse nor noisy, in some cases the scanning process might introduce artifacts in the scanned data set that are not easily eliminated during the polygonal mesh creation process (e.g., insufficient data manifested as holes in the mesh, noise, etc.). In these cases, the user should be able to eliminate such defects in the context of a surface approximation system.

The Choice of Surface Primitive for the Fitting Function

Our preferred choice of smooth surface representation for the fitting function is a combination of a tensor product B-spline surface and displacement map. Our reasons for choosing this hybrid representation are, briefly, as follows. The uniform tensor product B-spline surface was chosen to capture the coarse geometry of our polygonal patch, while the displacement map was chosen to capture fine surface detail. It is worth noting that our B-spline surface representation is one specific choice of a parametric surface; our general approach is extensible to other parametric surfaces (Bezier, NURBS, Catmull-Rom, H-splines, etc.).

Given our hybrid representation, one obvious question is: how do we decide the separation between the extent of geometry represented by the spline surface and that represented by the displacement map? Since the goal of the preferred embodiment application was to build an interactive surface fitting system, we leave this decision to the user. In our approach, the user has full control over the resolution of the B-spline surface to be fit to the geometry. The displacement map is calculated to automatically capture the residual geometry that was not captured by fitting the smooth B-spline. This provides the user with a lot of flexibility and for some application areas we have explored it is perceived by users as one of the key advantages of our approach. In order to successfully implement this strategy our fitting should satisfy several criteria.

First, if the user is to make an informed decision about the resolution of a B-spline surface, the fitting process should be fast enough to be used in an interactive setting. Only this would enable the user to conveniently experiment with a number of resolutions of B-spline surface before settling on a particular resolution.

Second, we would like to compute the best possible B-spline surface approximation to the underlying polygonal surface given a fixed number of control vertices. This is because, in our system the user may choose to create an extremely high resolution spline surface that completely captures all the surface detail. Therefore our surface fitting algorithms should be capable of capturing this surface detail entirely within the spline surface if required.

Characteristics of the Fit

There are two important characteristics of any fit that must be specified before we may choose (or devise) a fitting algorithm. The first of these is the issue of how closely the fitting function approximates the input data. If the fitted function is constrained to pass through the data points, it is an interpolating function; otherwise it is an approximating function. We are interested in a surface approximation to the polygonal mesh surface rather than just the mesh vertices. Therefore, an interpolating function in our context would be one that interpolated the polygonal mesh surface rather than just the mesh vertices. The density of our input data makes this an impractical objective since it could potentially require a very high number of control vertices to exactly interpolate the mesh surface. However, we are still interested in a high quality approximation to the mesh surface itself.

The second characteristics of our fit that must be specified is what it means for a smooth surface (or B-spline and displacement map) to be a "high quality approximation" to the polygonal mesh surface (i.e., in a mathematical sense). One method of measuring the quality of an approximating smooth surface is to examine the error of fit. Using this method, a lower error of fit would imply a higher quality surface approximation. However, this quantification of surface quality does not necessarily ensure desirable results. It is possible to generate zero error of fit surfaces (i.e., interpolating surfaces) that display "unfair" characteristics (i.e., the fitted surfaces tend to shown unsightly bumps and wiggles). Thus for two fits of equal error, one might be preferable to the other because it is fairer.

Furthermore, a unique property of parametric surface fits is that even given two fits of equal error and fairness, one might be preferable to the other because it has a better parameterization, i.e., a fair surface fit could still possess an unsatisfactory parameterization. Thus a high quality approximation in our context is one that possesses a low error of fit (in the sense described above), is geometrically fair and that has a high quality parameterization.

The Defining Features of our Solution Strategy

Based on the preceeding discussion, let us summarize a set of defining (or desirable) features of our solution strategy.

1. Our input polygonal patches have no topological or shape constraints other than that they are u-v parameterizable, i.e., each polygonal patch is an arbitrary manifold deformation of a planar surface. No further assumptions are made about patch topology or geometry. In particular, patches are not required to be height fields.

2. The control vertex resolution of the B-spline surface is chosen by the user. In a preferred embodiment our fitting strategy should create the "best possible" B-spline surface approximation at this user-specified resolution. The remaining geometry is captured in the displacement map. We would like this fitting procedure to work at interactive speeds to allow the user to easily experiment with multiple resolutions of B-spline surface (and hence displacement map).

3. It should be possible to capture all the geometry in the B-spline surface without smoothing. As explained earlier the user might choose to capture the entire geometry of a polygonal patch with just the B-spline approximation (rather than use a displacement map). If smoothing terms (such as membrane or thin plate terms) are introduced these will likely produce overly smoothed approximations that cannot capture all the geometry in the B-spline surface.

4. The user should have precise control over the fidelity with which various regions of the mesh should be captured in the B-spline surface. If the laser scanning process introduced noise or other kinds of defects into the scanned object, the user should be able to ignore these defects for purposes of surface approximation. Even if the laser scanning process was very accurate there could be defects in the original part that should be ignored for purposes of surface approximation.

5. The combination of B-spline surface and displacement map need only approximate the mesh surface, rather than interpolate the mesh vertices. As explained in the preceeding sections, our polygonal mesh represents an aggregated surface representation of the raw data and our mesh vertices do not necessarily represent the original scanned data points. We are thus interested in a high quality approximation to the polygonal mesh surface rather than just the mesh vertices.

6. The mesh connectivity should be used to assist the surface fitting process. This is important to note because traditional fitting solutions often discard connectivity thereby converting the problem to one of point cloud fitting. This approach can compromise correctness, robustness, efficiency and quality of fit.

NEW SURFACE FITTING FORMULATION

Clearly, gridded data fitting techniques are to be preferred over point cloud fitting techniques. Since our data is not in the form of a regular grid, these methods are not immediately applicable. However, if we were to convert our data into the above format we could exploit the advantages of gridded data fitting over point cloud fitting. This motivates a new solution strategy for our surface fitting problem:

1. First, resample each irregular polygonal patch into a regular surface grid, which we call the spring mesh.
2. Second, use the fidelity values specified for the input data to create an approximation-spring-mesh that deviates or follows the spring mesh according to low or high fidelity values.
3. Third, use gridded data fitting techniques on the approximation-spring-mesh to obtain a surface fit.

In the first step, we re-sample the polygonal patch into a regular surface grid called the spring mesh. In the second step, we create an approximation-spring-mesh from the spring mesh which deviates from the spring mesh according to an extent determined by the fidelity values of the underlying polygonal mesh. In the third step, we apply gridded data fitting techniques to the spring mesh to obtain our final B-spline surface approximation. This strategy allows us to avoid the complexity, cost and non-robustness of point cloud fitting algorithms while providing the user with fine-grain control over the surface parameterization and approximation processes. Recall that our displacement maps are extracted simply as the residual error of fit after the B-spline approximation is obtained, and are not necessary. Our fitting strategy allows us to avoid the complexity, cost and non-interactivity of the non-linear optimization process traditionally used for irregular data.

An alternate strategy to the one described here might be to combine steps 2 and 3 into a single step where gridded data fitting techniques are used on the spring mesh, and weights are assigned to the spring mesh points based on fidelity values. A weighted, least squares approximation technique could then be used to create the final spline surface approximation. While this technique is a viable alternative and might suffice for several applications, its principle disadvantage for an interactive application lies in the fact that it makes interactive tweaking of the surface approximation impractical. This is because least squares fitting works on the entire spring mesh at once. If the user wishes to make a local change to a small region of the spring mesh he would still have to perform a fit on the entire spring mesh before seeing an updated result. While gridded data fitting is a rapid (O(N) in the number of data points) operation, it is not rapid enough for interactive editing of the fit on large data sets.

It is very significant that because our methodology separates the surface approximation step from the parameterization step, each of these steps of surface approximation can be controlled independent of each other. Previous techniques combine both parameterization and surface approximation into one step that consists of creating a fixed "ideal" parameterization and a fixed "ideal" surface approximation based on the parameterization. As a result, the user does not have enough control over each individual step in the process. In contrast, our methods allow for fine control over both the parameterization step as well as the approximation step of the surface fitting process. The user can then generate several possible parameterizations for the same approximated shape. The parameterizations could vary based on several controllable criteria such as:

User-defined feature curves

Automatically generated feature curves

The user can also generate for any given parameterization several possible surface approximations. The approximations could vary based on several controllable criteria:

Output surface type (e.g., B-Spline, Bezier)

Global fidelity (either user defined, or defined using an automated scheme)

Local fidelity (either user defined, or defined using an automated scheme)

This separation of surface parameterization and surface approximation gives the user valuable fine-grain control over the entire process of surface fitting.

In our system, the generation of the spring mesh may be considered a pre-processing step. Its time complexity on average is $O(N_{vert})$ in the number of vertices $N_{vert}$ in the polygonal patch. The gridded data fitting step is on average $O((N_{vert})^{1/2})$. In comparison the cost of point cloud fitting is on average $O(N_{vert})$ per iteration step.

The spring mesh may be viewed as a high quality parameterization of the underlying data. In our application we use the spring mesh itself as the (gridded) data for the surface fitting step. We are more interested in a high quality approximation to the mesh surface itself rather than the mesh vertices. As long as the spring mesh produced is a reasonably careful sampling of the polygonal mesh, surface quality and detail are not compromised.

If in other applications it is required to fit the original mesh vertices (e.g., to obtain tolerances to the original data), this can be accomplished by first parameterizing the mesh vertices using our regular spring grid and then running the standard non-linear optimization process. For these approaches, our gridding process offers a robust, automatic, high-quality mesh parameterization scheme.

Below we explore in detail our gridding strategy for each polygonal patch and its advantages in an interactive setting. We also discuss strategies for adding flexible constraints to the parameterization process in the context of an interactive surface fitting system.

GRIDDED RESAMPLING

As outlined above, our fitting strategy works in three-step. First, each polygonal patch is re-sampled into a regular surface grid called the spring mesh. Second, an approximation-spring-mesh is constructed from the spring mesh taking into account the fidelity requirements for the approximation. Third, a B-spline surface is fit to the approximation-spring-mesh.

The input to our gridding process is a polygonal patch. A polygonal patch in the preferred embodiment is an arbitrary four-sided polygon mesh section. It will be appreciated that, in general, the polygonal patches may be n-sided, where n>2, and are not necessarily four-sided. In the preferred embodiment where n=4, the only constraints to this mesh section are that it must be rectangularly parameterizable and must not have holes. Both these assumptions are reasonable: first, in order that a tensor product B-spline surface be fit to the surface it must be rectangularly parameterizable. Second, the models input to our system are seamless or can easily be made so either by acquiring and integrating more scans or by using recent known hole-filling techniques. There are no further constraints (with respect to either topology or geometry) on polygonal patches. In particular, they are not restricted to be height fields.

For the first part of this discussion, we will assume that the only user input is the four boundary curves of the patch. A procedure is described to automatically generate a spring mesh re-sampling for this polygonal patch. Given just the four boundary curves of a polygonal patch as input, there are several plausible distributions of spring points. We begin by examining the properties that define a good spring mesh re-sampling. This leads to a qualitative measure for evaluating the desirability of a spring mesh re-sampling. We then quantify these characteristics in the form of a set of parameterization rules. We then outline an efficient implementation that generates spring meshes that obey our parameterization rules. This implementation is based on a coarse-to-fine relaxation process that incrementally builds up a better parameterization for the polygonal patch. We also discuss several desirable properties of our coarse-to-fine parameterization strategy. We follow this discussion with an analysis of the computational cost of our pararneterization algorithms.

In the second half of this discussion we introduce the notion of feature curves. These are user-specified curves that may be used to customize the distribution of points within the spring mesh, i.e., the parameterization. We call the resulting parameterizations feature-driven parameterizations. We introduce feature curves by examining our parameterization algorithm from a design perspective. From this perspective feature curves are a natural extension to our basic parameterization strategy. We discuss how our parameterization rules may be modified in the presence of feature curves. Then we discuss an implementation of feature curves. Our feature driven parameterization technique bears several similarities to the variational surface design literature. We also discuss an intuition for our feature-driven parameterization algorithm that is based on a variational surface design. We conclude with a summary of principal contributions and some practical examples of the uses of our parameterization algorithms.

DESIRABLE CHARACTERISTICS FOR A SPRING MESH

The spring mesh is essentially a regular grid of points that lie on the polygonal surface. We will refer to these points as the "spring points". The spring mesh can be viewed in two ways: first, it can be viewed as a parameterization of the polygonal patch. Second, since spring points lie on the polygon mesh surface, the spring mesh can be viewed as a re-sampling of the patch into a regular grid. We will draw on both these views of the spring mesh for our intuitions about the parameterization process. In the following discussion we use the terms parameterization and spring mesh re-sampling interchangeably.

Given a polygonal patch there are infinitely many distributions of spring points and therefore parameterizations of the patch. From the space of all these parameterizations some are usually preferable over others. Therefore, before we create a procedure to generate a parameterization, we must first answer the question: what does it mean for a parameterization (i.e., spring mesh) to be "preferable" over others? Clearly, since our spring meshes are used for smooth surface fitting, we should restrict our space of acceptable parameterizations to those that enable a high quality surface approximation.

Note that the above restriction does not yet narrow down our space of acceptable parameterizations: it is still possible to generate several different spring parameterizations each of which works just as well for approximating the geometry of the polygonal patch. However, not all of these parameterizations might be satisfactory to the user. Since users in many application areas (e.g., Entertainment and Industrial Design) play an important role in determining the desirability of a surface parameterization, whatever parameterization procedure we propose should take care to satisfy the user's requirements in addition to producing good approximations to surface geometry. Accordingly, we examine our parameterization procedure from a user perspective.

Since the spring mesh is essentially a re-sampling of the polygonal patch we begin our effort to characterize the desirability of an arbitrary spring mesh from a sampling perspective. The spring mesh is generated with the intent of fitting a B-spline surface and associated displacement map to it. In order that our fitted surface not lose any detail that was in the original polygonal patch, it is desirable that the spring mesh be as faithful a resampling of the polygonal patch as possible. Only if the spring mesh satisfies this requirement may we dispense with the irregular polygonal representation and use just the regular spring mesh for fitting purposes. Furthermore, we would like our spring mesh to be minimal in the sense that there should be no "wasted" spring points (samples). We therefore ask the question: What is the distribution and density of spring points that gives us a faithful sampling of the polygonal patch?

Consider a simpler version of the same question: for a given resolution of the spring mesh what is the distribution of spring points that represents a reasonable sampling of the surface? Since our triangulations come from real models that have been sampled uniformly over their surfaces, our triangle meshes tend to be uniformly dense (in terms of the number of polygons per unit area of the surface) across different parts of the polygonal model. If we assume that geometrical information is distributed according to polygon mesh density then for a spring mesh of a fixed resolution to sample the surface optimally each sample should represent an equal area on the polygonal surface. This gives us one qualitative measure of goodness for our spring mesh from a sampling perspective: For faithful re-sampling of a uniformly dense polygonal patch, each spring point should represent the same area of the polygon mesh. Furthermore, in order to dispense with the polygonal patch, the density of the spring mesh should be high enough that the finest details of the polygonal patch are captured by the re-sampling. This gives us a second qualitative measure. Our parameterization metric can therefore be encapsulated in the form of two qualitative rules:

1. Each spring point represents a constant size area of the polygon mesh.
2. The density of the spring mesh should be high enough to capture the finest details of the polygonal patch.

Figure 1A:
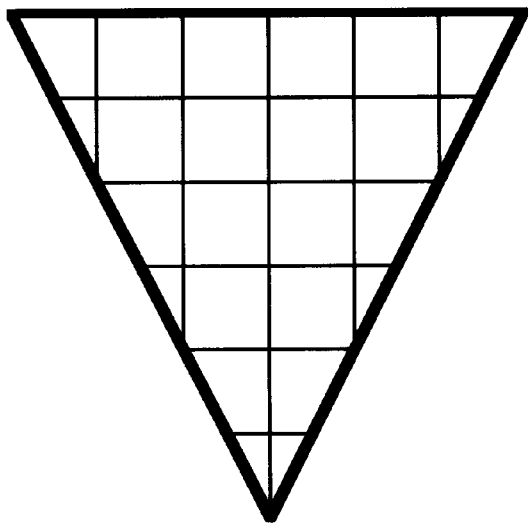
FIGS. 1A–1C show three possible parameterizations of a planar distorted patch.
Figure 1B:
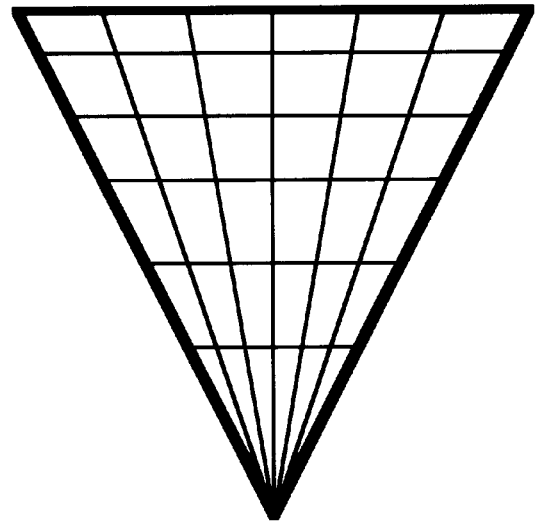
Figure 1C:
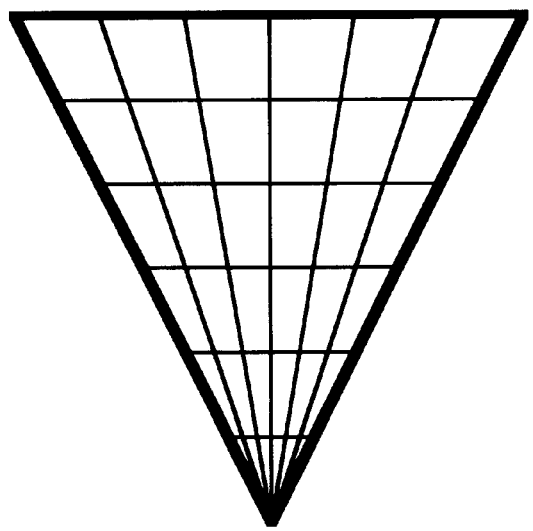

Although these qualitative rules summarize our requirements concerning obtaining a good approximation to geometry, they do not necessarily capture a user's notion of a desirable parameterization. This is easily illustrated with the help of an example. FIGS. 1A–1C show three possible "parameterizations" of a planar distorted patch. The parameterization in FIG. 1A might seem desirable at first since each spring mesh opening covers about the same area of the patch (barring the boundary regions). However, the spring mesh shown is not a regular grid, i.e., every horizontal (vertical) curve of the spring mesh does not have the same number of sample points as every other horizontal (vertical) curve. In other words, the parameterization is not acceptable to us because it is not a tensor product parameterization, i.e., each u (v) iso-curve does not contain the same number of points. This parameterization therefore does not suit our purposes despite the fact the sampling of the patch is somewhat even.

Our space of acceptable parameterizations is restricted to regular surface grids because that is the parameterization intrinsic to a tensor product parametric basis. Furthermore, the entire spring mesh must be present within the polygonal patch, i.e., the parameterization must be a regular, tensor product parameterization with its four boundaries being the same as the patch boundaries.

Consider now the parameterizations shown in FIGS. 1B and 1C. Both are regular surface grids. Note that both spring meshes have a singularity at the lower, collapsed boundary curve (i.e., the pole of the spring meshes). The singularity at the pole is a limitation of the tensor product nature of the parameterization rather than a limitation of the specific distribution of spring mesh points, i.e., no tensor product parameterization of this patch could avoid such a pole or the distortion associated with it. For example, the spring mesh of FIG. 1B minimizes area distortion. However, note the extreme distortion induced with respect to the arc length and aspect ratio. On the other hand FIG. 1C shows a parameterization that minimizes the arc length distortion in both parametric directions of the spring mesh. While it has some aspect ratio distortion, it is significantly lower than the distortion in spring mesh of FIG. 1B. However, note that it is more distorted with respect to area than FIG. 1B. In particular, the area elements near the pole are smaller than the ones farther from it.

Note that the spring meshes of both FIGS. 1B and 1C allow us to create acceptable surface approximations as long as the density of the spring mesh in each case is high enough. So which of FIGS. 1B and 1C is preferable for our application? To resolve this question let us examine our parameterization problem from a design (i.e., users) perspective.

The application domains that are the principal focus of this embodiment are entertainment and industrial design. For applications in these domains, the design of 3-D parametric surfaces has two key components: first, the design of the geometry of the surface, and second, the design of its parameterization. It is important to note that in general these are two separate activities even though existing commercial modeling packages such as Alias or Pro/Engineer use modeling paradigms (such as lofting or skinning) that treat them as a unified activity.

In our application the user is not designing so much the geometry of the fitted surface (which is ideally the same as that of the the input polygonal patch) as its parameterization. The design of a surface's parameterization is of critical importance to most modelers because it influences several important properties of the surface. For example, surface parameterizations determine the flow of a texture map over the surface. A surface that is not parameterized according to the users specifications is unlikely to appear satisfactory when texture mapped. Surface parameterizations also determine the precise changes in surface geometry when a control vertex of the surface is moved in space to a new location. An unsatisfactorily parameterized surface will usually deform in an unexpected (i.e., undesirable) fashion when a control vertex is moved. For these and other reasons having control over surface parameterization is crucial for most applications. To take a specific example from entertainment, the animation of a parametric surface representing a human face is better performed when the parameter lines of the surface flow according to anatomical features such as the eyes and the mouth of the face. Furthermore, animators often concentrate a greater number of parameter lines (hence control vertices) on and around regions of the surface that require fine geometric control, i.e., areas of the face that are the most expressive such as, e.g., the eyes. Similar examples can be found in the field of Industrial Design.

The foregoing discussions illustrate that it is important to evaluate any parameterization algorithm from a design perspective. Let us therefore ask the question: What parameterization did the user implicitly design by specifying a polygonal patch through its four patch boundaries?

We tackle this question in two parts. First, let us assume that our only user input is a set of four patch boundary curves and that an underlying polygonal surface does not exist, i.e., our input is just a set of four space curves. Based on just this input, a reasonable spring mesh output is a smooth blend in space of the four boundary curves. Furthermore, in the absence of other information it is reasonable to assume that the user intended the spring mesh to be uniformly spaced in both parametric directions. An example of the geometry and parameterization created by this kind of operation is a Coons patch.

Second, let us now add the additional polygonal surface constraint (i.e., the intermediate iso-curves must now be constrained to the polygonal surface). In this case, as an obvious extension to the first argument, the user could reasonably expect to have designed a spring mesh that represents a uniform and smooth blend on the polygonal surface of the four boundary curves.

Thus, given that the input from a user of our system are the four boundary curves of a polygonal patch, a reasonable parameterization for the polygonal patch is a spring mesh that is uniformly spaced in both the u and v directions and that represents a smooth blend on the surface of the boundary curves. Therfore, from a design perspective the parameterizations shown in FIG. 1C is preferable to the one shown in FIG. 1B because it represents a more uniform blend on the surface of the boundary curves. The parameterization in FIG. 1C distributes iso-parametric curves uniformly on the surface between each pair of opposing boundary curves.

The preceeding discussion demonstrates that, while minimal area distortion is a reasonable goal to strive for in a parameterization, it is not always desirable to achieve this goal. We must therefore create practical rules that generate parameterizations which encode our intuitions based on both the sampling perspective and on the design principles explained above. In the next section we quantify our qualitative characterization of the preceeding discussion in the form of simple and implementable parameterization rules.

It is worth noting that the foregoing discussion indicated that the choice of how to trade off different kinds of distortions in parameterizations is often subjective (i.e., application specific). Therefore a natural question to ask is: what if the user did indeed want to create the parameterization shown in FIG. 1B? Ideally our parameterization rules should be flexible enough to accommodate such scenarios.

QUANTIFYING THE PARAMETERIZATION METRIC

We would like practical rules that capture the qualitative parameterization metrics explained in the last section. Ideally, these rules should create parameterizations that have minimal area distortion (where permitted by patch topology) and as well that represent a uniform blend on the polygonal surface of the four patch boundary curves. In the discussion below, "iso-curves" refer to iso-parametric curves in one of the principal directions of the tensor product parameterization. An iso-curve is just a series of spring points that constitute a grid line of the spring mesh. We refer to the two principal directions of the spring mesh as the u and v directions. A u (v) iso-curve is an iso-parametric grid line with a fixed u (v) value and progressively increasing (or decreasing) v (u) parameter values.

Figure 2A:
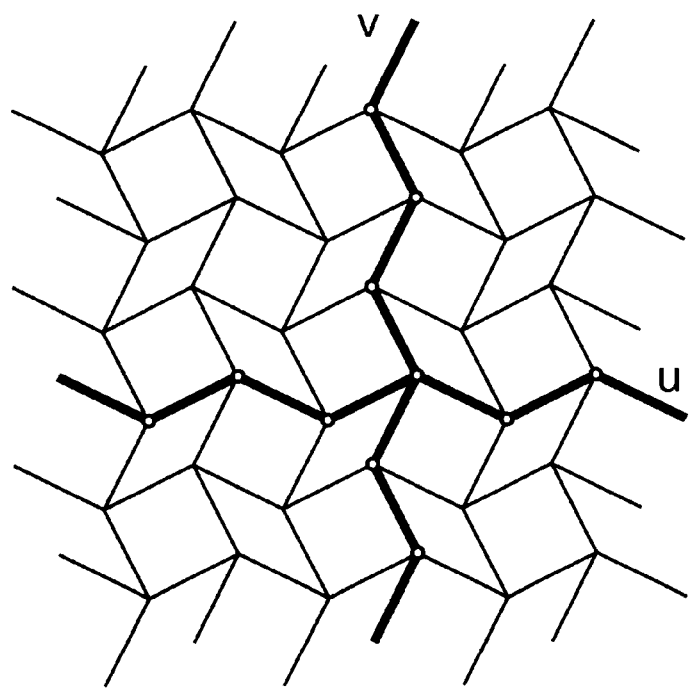
FIG. 2A shows a spring mesh that has uniform arc length and aspect ratio, but poor parametric fairness.

We begin our quest for practical parameterization rules by observing that regardless of the shape of the polygonal patch, it is always possible to create a spring mesh that minimizes distortion in grid spacing along a particular u or v iso-curve. For example, if we follow a fixed iso-curve u or v shown as bold lines in FIG. 2A, the spacing (on the surface) of the spring mesh points (shown as circles) along that iso-curve is uniform. We also note that to create an even sampling in both the u and v directions, the spring mesh points in each direction should be about the same distance apart. These observations are encapsulated in the following two parameterization criteria:

1. Arc length uniformity: the spring mesh spacing along a particular iso-curve should be uniform.

2. Aspect ratio uniformity: the spring mesh spacing along a u iso-curve should be the same as the spacing along a v iso-curve.

These rules encapsulate, at least partially, our requirements for a minimally distorted spring mesh. When evaluated from a sampling perspective, the arc-length criterion accounts for the fact that geometrically interesting detail is equally likely along any given section of an iso-curve along the surface. Similarly, the aspect-ratio criterion captures the fact that detail is equally likely in either direction of a gridding of the polygonal patch.

Unfortunately, neither of these rules encapsulate the notion of a "minimal" parameterization. Consider for example a small section of a spring mesh shown in FIG. 2A. Note that the spring mesh section satisfies both the arc length and aspect ratio criteria specified above. However, the parameterization of the spring mesh section is still unsatisfactory: while it does encode our notion of a uniform blend on the surface of the four boundary curves, it is not a smooth blend. From a practical perspective, the parameterization shown would exhibit undesirable characteristics such as a wavy appearance under texture mapping. Similarly, pulling on a control vertex of the surface would induce an undesirable wavy deformation on the surface. Clearly the aspect ratio and arc length uniformity rules do not restrict the space of acceptable parameterizations strongly enough. Noting this fact, we add a regularization criterion (a minimal energy rule) to the above two criteria.

3. Parametricfairness: Every u and v iso-curve should be of the minimum possible length given the first two criteria.

The term "fairness" has its roots in the geometric interpolation literature where it is used to convey the concept of minimum energy interpolating surfaces. Our use of the term fairness is in the context of achieving a minimal energy parameterization hence: parametric fairness. Previous applications have addressed the issue of fairness only to the extent that it affects surface shape, not as it affects surface parameterization.

Figure 2B:
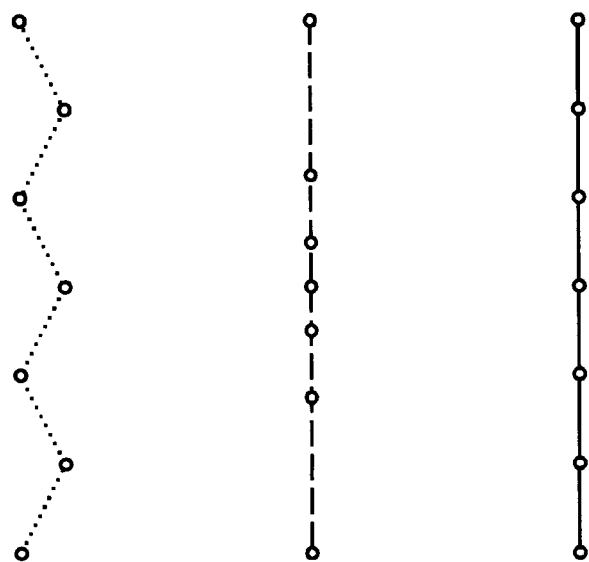
FIG. 2B shows three lines that illustrate the interaction between parametric fairness and arc length.

FIG. 2B shows the interaction of the parametric fairness rule with the arc length rule on a section of a single v iso-curve. The parametric fairness rule by itself creates minimal length curves (dashed line), but with possibly uneven spacing between grid points. The arc length uniformity rule alone, on the other hand, creates evenly spaced curves (dotted line) but with possibly jagged shapes. When used in conjunction, the two rules produce even, smooth curves (solid line).

Figure 3A:
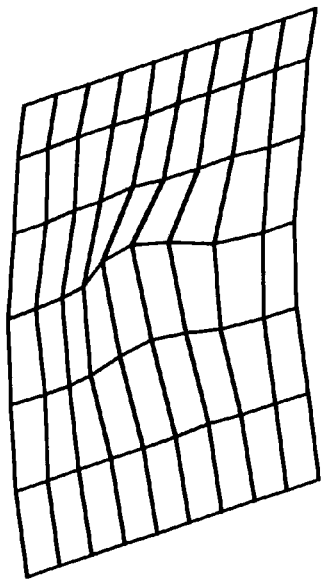
FIGS. 3A–3D illustrate three sampling criteria applied to a smooth spring mesh individually and in conduction.
Figure 3B:
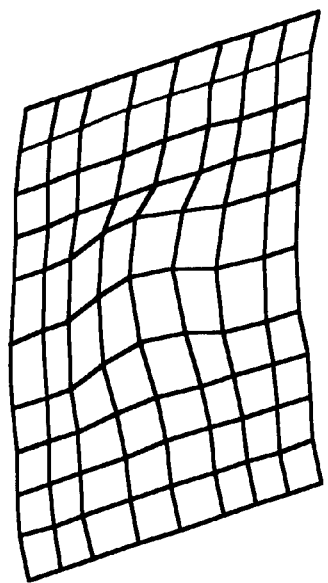
Figure 3C:
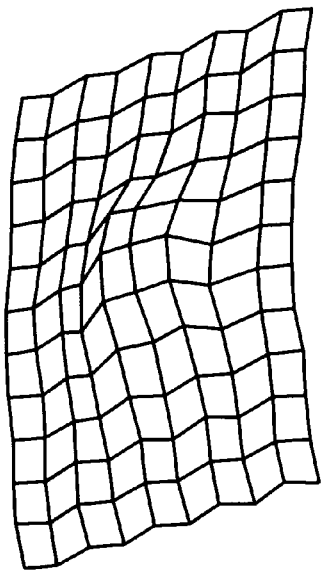
Figure 3D:
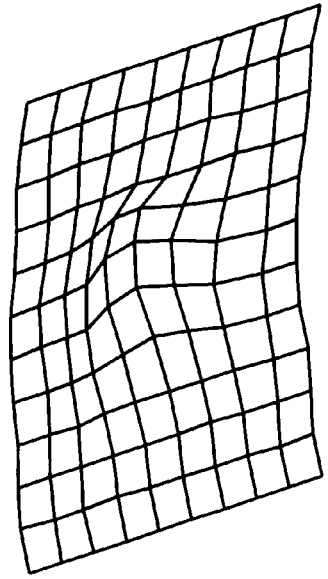

FIGS. 3A–3D illustrate all three sampling criteria. Each of the images represents a smooth spring mesh at a very low resolution. In each case, the number of spring points sampling the polygon mesh is kept the same. The differences arise from their redistribution over the surface. FIG. 3A shows what happens when the aspect ratio criterion is left out. Notice how a lot of detail is captured in the vertical direction, but not in the horizontal. FIG. 3B shows the effect of leaving out the arc length criterion. Notice how the bump looks slightly bloated and that detail above and around the region is missed. This is because few samples were distributed over the bump resulting in a bad sampling of this region. FIG. 3C shows a missing fairness criterion. The iso-curves exhibit many "wiggles". Finally FIG. 3D shows the result when all three criteria are met.

The three qualitative parameterization rules listed above effectively define a higher order energy functional on the surface mesh. Minimizing this functional provides minimum energy (i.e., parametrically fair) spring meshes that minimize arc length and aspect ratio distortions. It is worth noting that an implicit assumption we have made during the formulation of these rules is that surface detail in a region of the mesh is dictated solely by the number of polygon mesh vertices (or polygons) in that region. Since for our meshes the vertex density is fairly uniform (with respect to surface area) over the entire polygonal mesh it is desirable that our parameterization rules evenly distribute spring points on the mesh surface.

It is easy to see that at least from a sampling perspective our parameterization rules are conservative: they will in general require more samples than might be necessary for an optimal sampling of a polygonal patch. For example, a flat region of the surface will use up as many spring points as a highly curved region of the surface as long as they possess the same surface area (and hence the same number of mesh vertices). In other embodiments, our parameterization rules could take into account properties such as surface curvature, so that the number of spring points would be concentrated on more complex regions of the surface. In any case, our strategy has two desirable characteristics. First, because it is conservative we are at least guaranteed to never miss any surface detail. Second, on a practical note, it is conceptually and numerically straightforward to perform computations on a uniform spring mesh representation compared to a more involved but optimal representation (such as a hierarchical spring mesh with a quad-tree like structure).

It is worth comparing our problem to those that arise in the finite element literature, specifically in the area of numerical grid generation. The objective in this domain is to generate (either structured or unstructured) grids in $\mathbb{R}^n$ as well as on surfaces in $\mathbb{R}^n$ Specifically, extensive research has been done on various strategies for generating surface grids in $\mathbb{R}^3$. However, these techniques are not directly applicable because they assume the existence of a higher order surface description (such as a B-spline surface) to start with. A higher order surface description allows the use of several smoothness properties such as global differentiability that are not available to us. As pointed out earlier, while it is possible to make local approximations to surface curvature for irregular polygonal surfaces, there is no scheme to evaluate global derivatives at arbitrary surface positions.

A FAST GRIDDING ALGORITHM

In the last section we specified a set of parameterization rules to generate fair spring meshes with low aspect ratio and arc length distortion. In this section, we describe an algorithm that efficiently discretizes and implements these parameterization rules. Our algorithm is an iterative, coarse-to-fine procedure that for each polygonal patch, incrementally builds a successively refined spring mesh. Specifically, the procedure iterates between two steps: a relaxation step and a subdivision step. The relaxation step works at a fixed resolution of the spring mesh. It ensures that the spring points at this fixed resolution are moved on the surface so that the resulting spring mesh satisfies our three parameterization rules (i.e., minimizes the discretized energy function defined by the rules). The subdivision step increases the resolution of the spring mesh by adding a new set of spring points to the existing parameterization. We continue this coarse-to-fine iteration until the spring mesh density is close to the density of vertices of the original polygonal patch.

We begin our coarse-to-fine iteration with an initial guess for the spring mesh iso-curves that is based on Dijkstra's shortest-path algorithm with an appropriate aspect ratio for this patch. We restrict this computation to just the vertices and faces of the polygonal patch rather than the entire mesh. Since the polygon patch is just a connected graph, identifying a set of vertices and faces of the polygonal patch that belong to a polygonal patch is easily performed using a breadth first seed fill operation. In the next few sections we describe the details of each step of our gridding algorithm.

SPRING MESH INITIALIZATION

To obtain a coarse initial guess for a set of u and v iso-curves, we use a well-known single-source, single-destination, shortest-path algorithm to compute a path between corresponding pairs of points along opposing boundary curves. The initial numbers of iso-curves in each direction are chosen to be proportional to the aspect ratio of the patch. The aspect ratio of a polygonal patch is computed as the ratio of the longer of the two boundary curves in either direction. The starting spring mesh points are computed as intersections of these initial iso-curves; the curves must intersect if the patch is rectangularly parameterizable. Dijkstra's algorithm is O(N log(N)) in the number of vertices N of the polygonal patch. Since polygonal meshes are actually planar graphs they possess a simpler structure than arbitrary graphs. Consequently, a linear-time algorithm exists to perform the shortest patch computation for planar graphs. However, there have been no reports of practical implementations of these algorithms. We have found Dijkstra's algorithm to perform adequately for our purposes. Since we search for only a small set of initial iso-curves, this procedure is rapid.

SPRING MESH RELAXATION

The initial guess for the spring mesh as obtained above is generally of poor quality. Furthermore, we have chosen to compute this initial guess at a low resolution. Nevertheless, the initial spring mesh serves as a good starting point for our relaxation process.

In the relaxation step, we move the spring points (at a given resolution of the spring mesh) to new locations on the polygonal patch such that the resulting spring mesh satisfies our parameterization rules. Note that we have already implemented the rule of aspect ratio uniformity with our initialization step. As the spring mesh is uniformly subdivided this aspect ratio is maintained. Therefore, we do not explicitly enforce this criterion as part of our relaxation procedure. We enforce just the two remaining parameterization rules of arc length and parametric fairness.

The relaxation algorithm works in two steps. First a "resultant force" is computed on each spring point. This force is based on our parameterization rules of arc length and parametric fairness. In the second step this force is then used to slide the spring point to a new position on the polygonal surface (within the polygonal patch). All spring points are moved in this manner until the spring mesh attains its equilibrium state, i.e., when the resultant forces on all the spring mesh points are zero.

In the next few subsections, the "force" between two spring points is computed as the Euclidean vector joining the two points, i.e., $$\text{Force}(P_a, P_b) = P_a - P_b.$$

Figure 4:
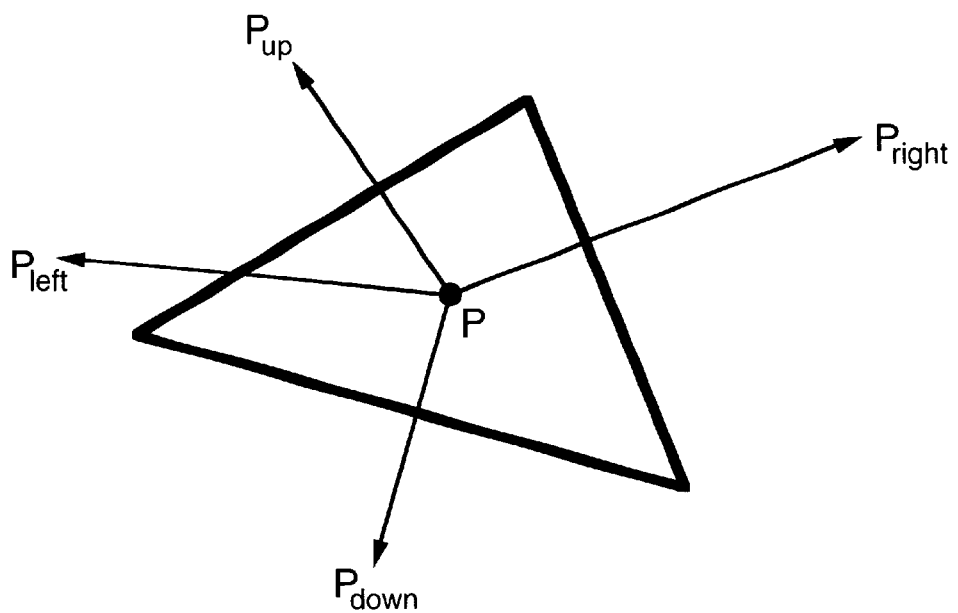
FIG. 4 illustrates the relaxation forces experienced on a face point P due to its neighbors $P_{left}$, $P_{right}$, $P_{up}$, and $P_{down}$.

To understand the details of our relaxation procedure let us focus on the forces on just an individual spring point P. Let $P_{up}$, $P_{down}$, $P_{left}$ and $P_{right}$ represent the positions of the P's four neighbors in the spring mesh in the u and v directions. FIG. 4 shows the neighbors $P_{left}$, $P_{right}$, $P_{up}$, and $P_{down}$ of a face point P of the spring mesh. The resultant force on the spring point during the relaxation step is a linear combination of these forces. We first examine the arc length and fairness forces in turn and then discuss how these forces may be combined in a relaxation strategy.

The Arc Length Criterion

Minimizing arc length distortion along one of P's iso-curves is achieved by simply moving P towards whichever neighbor (along the same iso-curve) is farther away from it.

The force due to the arc length corresponding to the up-down iso-curve (i.e., $P_{up}$ and $P_{down}$) is:

$$F_{arc-ud}(P) = (|\text{Force}(P_{up}, P)| - |\text{Force}(P_{down}, P)|) t_{max} / \|t_{max}\|$$

where $$t_{max} = \text{Max}(\text{Force}(P_{up}, P), \text{Force}(P_{down}, P)),$$

i.e., $t_{max}$ is the larger (in magnitude) of Force($P_{up}$, P) and Force($P_{down}$, P).

If the magnitudes of the forces happen to be equal, then the arc length force is zero. The two expressions Force($P_{up}$, P) and Force($P_{down}$, P) represent forces on the spring point P due to each of the spring points $P_{up}$ and $P_{down}$. We perform a similar computation in the other direction (left-right) as well to get a force $F_{arc-lr}$. The resultant of $F_{arc-lr}$ and $F_{arc-ud}$ is the net arc length based force acting on the spring point P, i.e., $$F_{arc}(P) = F_{arc-lr}(P) + F_{arc-ud}(P).$$

The Parametric Fairness Criterion

Let us now examine the force on P due to the parametric fairness criterion. Recall that this criterion attempts to make every iso-curve of the minimum possible length, i.e., it tries to pull each iso-curve as "tight" as possible given the other constraints on the spring mesh. The following first order term (i.e., the membrane term) minimizes the length of the curve:

$$E_{internal}(v(s)) = \int_0^1 |v_s|^2 ds.$$

In our current context, we interpret v(s) to be an iso-curve of the spring mesh and $E_{internal}$ to be the internal energy of the iso-curve. The discretized variational formulation of this equation gives rise to a single resultant force that moves a point to the mid-point of its two neighbors along the curve. Computing this for an "up-down" iso-curve we obtain the following:

$$F_{fair-ud}(P) = \text{Force}(P_{up}, P) + \text{Force}(P_{down}, P).$$

We obtain a similar expression for the other iso-curve passing through P. The resultant force due to parametric fairness is therefore:

$$F_{fair}(P) = F_{fair-lr}(P) + F_{fair-ud}(P).$$

We note that the parametric distortion is therefore minimized by moving the point P to a position that minimizes the energy corresponding to a set of springs consisting of P and P's immediate neighbors along both iso-curves that pass through it, i.e., $$F_{fair} = \text{Force}(P_{up}, P) + \text{Force}(P_{down}, P) + \text{Force}(P_{left}, P) + \text{Force}(P_{right}, P).$$

In this sense our regular surface grid behaves like network of springs that are constrained to the polygonal surface. Our use of the phrase "spring mesh" to describe our surface grid was motivated in part by the behavior of our surface grid under the effects of the parametric fairness criterion.

Relaxation Using the Arc Length and Fairness Criterion

The last two sections explained how to compute the force on an individual spring point P based on our two parameterization rules of arc length and parametric fairness. The point P is now moved according to a force given by a weighted sum of the arc length force $F_{arc}(P)$ and parametric fairness force $F_{fair}(P)$.

$$F_{result}(P) = \alpha F_{fair}(P) + \beta F_{arc}(P).$$

The relative weights of these terms are assigned as follows. We start each iteration with a higher weight for the arc length force (i.e., $\alpha=0$ and $\beta=1$). As the iteration progresses we gradually reduce the weight of the arc length term and increase the effect of the fairness term (i.e., $\alpha=0.5$, $\beta=0.5$). The parametric fairness force is meant mainly as a regularizing force. Its purpose is to create a minimal parameterization that obeys the other rules. As such the spring mesh relaxation should be guided mainly by the arc length parameterization rule. Our weighting of the relative effects of the arc length and fairness forces is based on this intuition. In practice, this strategy has proved to produce satisfactory results.

Figure 5A:
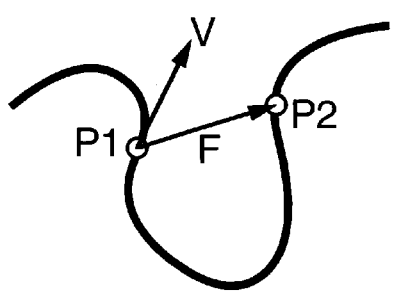
FIGS. 5A and 5B illustrate how spring mesh relaxation based on Euclidean forces alone can fail to move a spring mesh point in the desired direction, and how this problem is solved through the use of a mid-point.
Figure 5B:
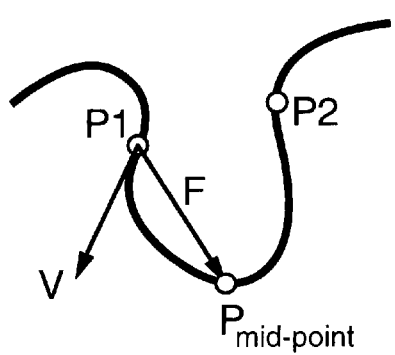

Note that we have used only Euclidean forces in our relaxation step, i.e., forces that represent the vector joining the two spring points under consideration. A relaxation step based purely on Euclidean forces is efficient but not guaranteed to always generate robust results. FIGS. 5A and 5B illustrate how spring mesh relaxation based on Euclidean forces alone can fail to produce the desired effect. These figures show a case where relaxation alone fails to move a spring mesh point in the desired direction. In each case F represents the force on a point P1 from its right neighbor P2, and V represents the resulting direction of motion based on Euclidean forces alone. The desired motion of the point P1 is into the cavity. In FIG. 5A, however, just the opposite occurs; the points move apart. FIG. 5B shows how this case is handled by subdividing the spring mesh along the surface using an additional midpoint $P_{mid\text{-}point}$.

An alternative to using Euclidean forces is to compute geodesic forces. These are simply forces that are computed along the surface of the mesh. Geodesic forces would produce the robust and correct motion for the spring points in the above case. Therefore, one approach to solving the problem exemplified by FIG. 5A would be to use geodesic forces, or approximations thereof, in the relaxation step (instead of Euclidean forces). However, computing discrete polygonal geodesics is an expensive proposition since the fastest algorithm for point to point geodesics is $O(n^2)$ in the size of a polygonal patch. Even approximations to geodesics such as those that are based on local graph searches are $O(n)$ and would be too expensive to perform at every relaxation step (for every force computation).

Spring mesh subdivision, illustrated in FIG. 5B, helps to alleviate the problem shown in FIG. 5A: we create a new spring point $P_{mid\text{-}point}$ that lies on the surface halfway between P1 and P2. This new point generates new Euclidean forces acting on the original points, moving them towards each other on the surface rather than away.

SUBDIVIDING THE SPRING MESH

Spring mesh subdivision is based on a graph search and refinement algorithm. Our subdivision algorithm is based on a procedure that, given any two spring points P1 and P2 computes a new face point $P_{mid}$ at the mid-point on the surface of the two spring points. We call this procedure FindMidPoint(P1, P2, $P_{mid}$). The details of the implementation of this procedure are as follows:

1. Find the two closest vertices v1 and v2 on P1 and P2's faces.
2. Compute a greedy graph path from v1 to v2. The mid-point of this path serves as a first approximation to $P_{mid}$'s location.
3. Refine this location by letting the forces given by Force(P1, $P_{mid}$) and Force(P2, $P_{mid}$) act on $P_{mid}$, moving it to a new position on the surface.

Note that the last step in the subdivision process is simply the application of a fairness force locally at the point $P_{mid}$ to make the curve section formed by P1, P2 and Pmid as tight as possible. Subdivision along boundary curves is based on a static resampling of our face point curve representation; these points are never moved during the relaxation and subdivision steps.

Based on the above algorithm, the subdivision algorithm uniformly subdivides the spring mesh in both parametric directions. Note that since the aspect ratio criterion was enforced at the time the spring mesh was created, it is maintained through successive subdivisions of the spring mesh.

Our coarse-to-fine strategy thus works by iterating between a relaxation step and a subdivision step. An issue still to be addressed is the termination criterion for this iterative process. As explained earlier, we would like our spring mesh at the highest resolution to represent a faithful re-sampling of the polygonal patch. For this to occur our spring mesh must capture all the fine surface detail in the original polygonal patch. Recall that a fundamental assumption of our re-sampling strategy was that this surface detail is uniformly distributed (or at least equally likely) over the surface of the polygonal patch. Since our spring mesh uniformly samples the polygonal surface, a conservative strategy for capturing all the surface detail present in the original patch is to use at least as many spring points as mesh vertices. Thus we terminate spring mesh subdivision when the number of spring points is comparable to the number of vertices in the original polygonal patch. This termination criterion is a conservative one. A more aggressive strategy for terminating spring mesh subdivision might be to quantitatively measure the cumulative error between a reconstruction of the spring points and the underlying polygonal surface. In practice we have found our conservative termination criterion to work well in an interactive setting.

DISCUSSION

The spring meshes generated by the algorithm described in the previous section are minimally distorted with respect to aspect ratio and arc lengths. In addition, the parametric fairness criterion ensures that the spring meshes represent minimal energy parameterizations (in the sense defined earlier) subject to the other constraints. In practice we have found that our resulting spring meshes have low area distortion as well. As explained earlier, our subdivision and relaxation criteria enforce this at least partially. Note that we do not guarantee minimal area distortion for our parameterizations. Indeed, it is not always desirable to produce a minimal area distortion parameterization for arbitrarily shaped polygonal patches.

Our conservative termination criterion for spring mesh subdivision ensures that our spring meshes are dense enough that they capture the finest surface details of the polygonal patches. This, combined with the minimal distortion characteristics of our parameterization effectively satisfy the two qualitative criteria we proposed, i.e., our parameterizations are both minimally distorted as well as represent a faithful re-sampling of the polygonal patch. It is in this sense that our spring meshes also represent a high quality parameterization of the underlying polygonal patches.

Our coarse-to-fine gridding algorithm has several desirable properties that make it practical and useful in the context of an interactive surface fitting system. First, the coarse-to-fine nature of our algorithm makes it efficient. The average cost of the relaxation and subdivision steps of our algorithm are O(N) in the size of the polygonal patch. Earlier polygon mesh parameterization algorithms run an order of magnitude slower ($O(N^2)$) than the one we have described above.

A second advantage of our parameterization strategy is that although our algorithm is completely automated, it can be effectively controlled and directed by the user. For example, the user can pause the algorithm at a coarser resolution of the spring mesh to view the intermediate results. If desired, these coarser spring meshes can be used immediately for surface fitting purposes. This is a useful property of our system, especially when dealing with large polygonal meshes. In particular, subdivision to higher levels can be postponed until the model designer is satisfied with a patch configuration and parameterization.

A third advantage of our coarse-to-fine parameterization algorithm is that it offers a flexible framework within which to add further constraints to the parameterization. For example, we discuss in detail below a powerful set of constraints called feature curves that the user can employ to create arbitrarily complex parameterizations.

Finally, our parameterization strategy has useful implications for the later surface fitting process (i.e., the gridded data fitting process). Specifically, once a spring mesh has been generated, the gridded data fitting process is fast. Furthermore, since our spring meshes are generated only once per patch (i.e., no further patch re-parameterization is required), the user can change the resolution of the fitted spline surface and the system responds at interactive rates with the fitted results. Systems that iterate between fitting and re-parameterization typically cannot respond at these rates and are therefore unsuitable for use in an interactive setting. Overall, we have found our pipeline to be a useful interactive tool for a modeler, especially when he or she wishes to explore the design space of tradeoffs between explicitly represented geometry and displacement mapped detail.

There are other schemes that may be used to parameterize irregular polygon meshes, e.g., known harmonic maps that produce parameterizations for mesh vertices with low edge and aspect ratio distortions. However, the harmonic map scheme has two main drawbacks for our purposes. First, it can cause excessive area distortions in parameter space, especially in the interior of the patch. Second, the algorithm employs an $O(N^2)$ iteration (in the size of a polygonal patch) to generate final parameter values for vertices of the mesh and no usable intermediate parameterizations are produced. As pointed out in the discussion above, we have found intermediate parameterizations useful in an interactive system. Finally, our algorithm allows for a powerful set of user-defined constraints in the form of feature curves which can be used to create arbitrarily complex and customizable parameterizations.

TOTAL COST

The typical cost of our coarse to fine parameterization strategy in terms of the size N of the polygonal patch is as follows:

1. Initialization: O(N log N).
2. Relaxation: O(N) cumulative cost.
3. Subdivision: O(N) cumulative cost.

Note that the initialization step of our process is more expensive than both the relaxation and subdivision together. This problem could be alleviated in theory by using a known linear time algorithm to perform shortest path computations on planar graphs. Using this algorithm would bring our average parameterization cost to O(N). However, we have found no reports of any practical implementation of this algorithm. In practice Dijkstra's algorithm performs adequately for our purposes.

In the worst case the last two steps are both $O(N^2)$. The conditions under which this occurs are:

1. Relaxation: spring points at finer levels of the spring mesh move just as far as the spring points at coarser levels, i.e., we derive little or no benefit from relaxation at coarser levels.
2. Subdivision: the polygonal patch has an excessively distorted aspect ratio.

In practice, both these conditions do not occur except in pathological cases. A simplistic alternative to our coarse-to-fine strategy could be to immediately subdivide the spring mesh to the finest level and relax the spring mesh at this level. In this case, since the individual spring points must now all move through a distance O(N) as well as the spring mesh resolution at the finest level is O(N), the cost of running the relaxation is typically $O(N^2)$. Thus from a computational point of view the coarse-to-fine strategy is preferable to this strategy. The coarse-to-fine strategy is more robust than a single step strategy.

A PARAMETERIZATION DESIGN PERSPECTIVE

Given that the input supplied by the user normally includes only a set of patch boundaries (i.e., a polygonal patch), our automated coarse-to-fine relaxation algorithm generates an acceptable (i.e., a minimally distorted as well as fair) parameterization. A reasonable question to ask of any such automated parameterization scheme is: what if the automatically generated parameterization is not acceptable to the user?

To explore the possibilities raised by this question, let us re-examine our parameterization algorithm from a design perspective. We posed the question: what parameterization did the user implicitly design by specifying a polygonal patch through its four patch boundaries? We argued there that a user can be reasonably expected to have designed a spring mesh that represents a smooth and uniform blend on the polygonal surface of the four boundary curves. Note that this is the result that our automatic parameterization procedure generates: the iso-curves are uniformly spaced in both the u and v directions (based on the arc length constraint) and represent a smooth blend on the surface of the boundary curves (based on the parametric fairness constraint). In addition, each surface element (spring mesh opening) is as close to square as possible (based on the aspect ratio constraint).

With this design perspective let us re-phrase the question we asked at the beginning of this section: what if our (automatically generated) blend on the polygonal surface of the four boundary curves does not create an acceptable parameterization of the polygonal patch? The design of the parameterization of a surface cannot, in general, be automated. This situation calls for the user to specify additional input in the form of constraints to the parameterization procedure. There are several possible kinds of constraints a user could specify. Our ability to add constraints of the sort is indicative of the generality and extensibility of our parameterization strategy.

FEATURE CURVES

Most generally, we define afeature curve as a face-point curve painted on the polygonal patch and used as a constraint in the parameterization process. By way of introduction, this section focuses on a specific type of feature curve, an iso-parametric feature curve, i.e., a face-point curve that starts at any one boundary curve and ends at the opposite boundary curve, where exactly one iso-curve of the spring mesh is constrained to follow this feature curve. This means that the spring points that correspond to the selected iso-curve are constrained to lie on the feature curve. During the parameterization process, the entire spring mesh is coerced into smoothly interpolating the feature curve constraint. In general, a user can specify arbitrarily many feature curves all of which are used as constraints to the parameterization procedure. Feature curves are a form of scalable constraint: in the limit, the user could in theory use iso-parametric feature curves to manually specify every single iso-curve of the spring mesh, and thereby totally determine the patch parameterization. Naturally, this would be an extremely laborious and therefore undesirable procedure and is not an expected use of the feature curve paradigm.

Our strategy of using feature curves for parameterization design has not been attempted previously in the surface fitting domain. Previous work in this domain has focussed exclusively on capturing just the geometry of the input mesh, rather than on the design of a suitable parameterization. In contrast we separate the two tasks of first designing a parameterization and second approximating surface geometry. It is worth noting that parameterization design in the texture mapping literature can exhibit objectionable parametric distortions in the case of non-regular data sets.

As discussed in the previous section, a useful interpretation of our automatically generated spring meshes is as a blend on the polygonal surface of the four boundary curves. The interpretation extends in a straightforward manner to feature curves. First, assume we are given just the four boundary curves and feature curves in space (i.e., there is no underlying polygonal surface). A reasonable spring mesh based on this input is a blend in space of all the curves involved. This operation is referred to as skinning in the field of parametric surface design. As such, it is a straightforward extension of the more common Coon's patch blend. In the presence of an underlying polygonal mesh, a reasonable result for the spring mesh is a smooth blend on the surface of both the boundary and the feature curves. We use this intuition to modify our parameterization algorithm in the presence of feature curves.

Specifying a Feature Curve Constraint

Feature curves (or simply features) may be specified using exactly the same painting procedure that was used to create patch boundaries. The following constraints are imposed on (iso-parametric) feature curves:

Features must lie on the polygonal mesh surface

Features must lie within a polygonal patch that is being parameterized

Features must start and end at points on opposing boundary curves of a polygonal patch We impose no further constraints on the placement of iso-parametric feature curves. A user specifies a feature curve by painting a surface curve. In the case where feature curves are also iso-curves of the parameterization the user paints (on the surface) a face-point curve that starts at a point on one boundary curve and terminates at a point on the opposing boundary curve. The user must paint reasonable feature curves to obtain sensible parameterizations. An example of an unreasonable set of feature curves are two u (or v) feature curves that intersect with each other at one or more points. In this case the spring mesh generated by our algorithm will fold on itself since the feature curves folded onto themselves to begin with. We leave these kinds of design choices to the user rather than alleviate them by adding constraints to our parameterization procedure.

Imposing the first two constraints (i.e., that feature curves lie on the polygonal mesh and within a polygonal patch) is trivial: we simply restrict the painting procedure to vertices and polygons of the specific polygonal patch. The third constraint is imposed as follows. When a user picks a start point for a feature curve, we identify the closest point on the boundary curve that is nearest to the face-point (or mesh vertex) picked by the user. This selects out both a closest boundary curve and a point on that boundary curve that is closest to the start point. We implement this operation using a brute-force approach: we compute the Euclidean distance between the user defined point to each face-point of each boundary curve and pick the closest face-point. Despite being a brute force algorithm, this operation is rapid in practice. A graph search based algorithm might be more efficient but in practice it is not needed for this particular operation.

Once we have determined the start point on a specific boundary curve, we join the point to the first user picked point using a curve-painting procedure. The user now paints the rest of the feature curve using the usual curve painting process. The boundary curve on which the end point lies is the one opposite to the start point's boundary curve. To terminate the feature curve, we must add a curve section that reaches from the last user picked point to the closest point on this opposing boundary curve. This is accomplished using a procedure similar to the one used to compute the start point of the feature curve. First, we find the face-point on the opposing boundary curve that is closest in Euclidean space to the last user-picked face-point. Second, we create a curve section between the two points and append this to our feature curve.

Once painted, feature curves may be edited using exactly the same kind of tools that were used to edit boundary curves. The result of our feature curve painting step is a set of polygonal patches annotated with one or more feature curves. These curves are now used as constraints to the spring mesh relaxation process.

Using Feature Curves to Guide Spring Relaxation

Figure 6A:
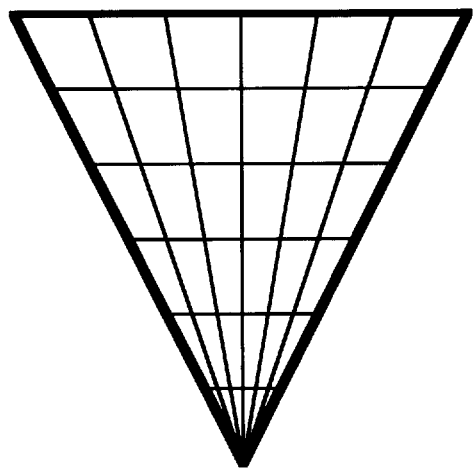
FIGS. 6A and 6B illustrate how feature curves in a patch are used to guide the parameterization for the patch.
Figure 6B:
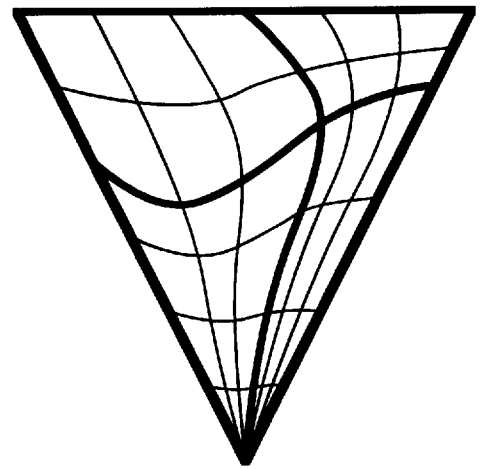

While feature curves are a fairly intuitive extension of our parameterization strategy from a user's viewpoint, the resulting spring meshes are likely to be even more globally distorted than an unconstrained spring mesh. An example of the additional distortion introduced due to feature curves is shown in FIGS. 6A and 6B. FIG. 6A shows an already distorted patch shape and the associated spring mesh (shown as a grid). There are no feature curves in this patch. Note that the spring mesh satisfies our three parameterization rules but is still distorted with respect to area. FIG. 6B shows the same patch shape but with two feature curves as well (shown as thicker curves). Note that the resulting spring mesh is even more distorted than the one shown in FIG. 6A. The additionally distorted spring mesh is the desired result since it is the the user who has specified the feature curves in the first place. Let us therefore re-examine our three sampling criteria to accommodate the distortion introduced by feature curves. In our discussions we will find it useful to use the notion of a spring section and a spring sub-patch. These are defined as follows:

Spring mesh section: a set of spring points that lie in-between two successive u or v feature curves.

Spring mesh sub-patch: a set of spring points that are bounded by adjacent feature curves (or boundary curves) in both the u and v directions.

Figure 7:
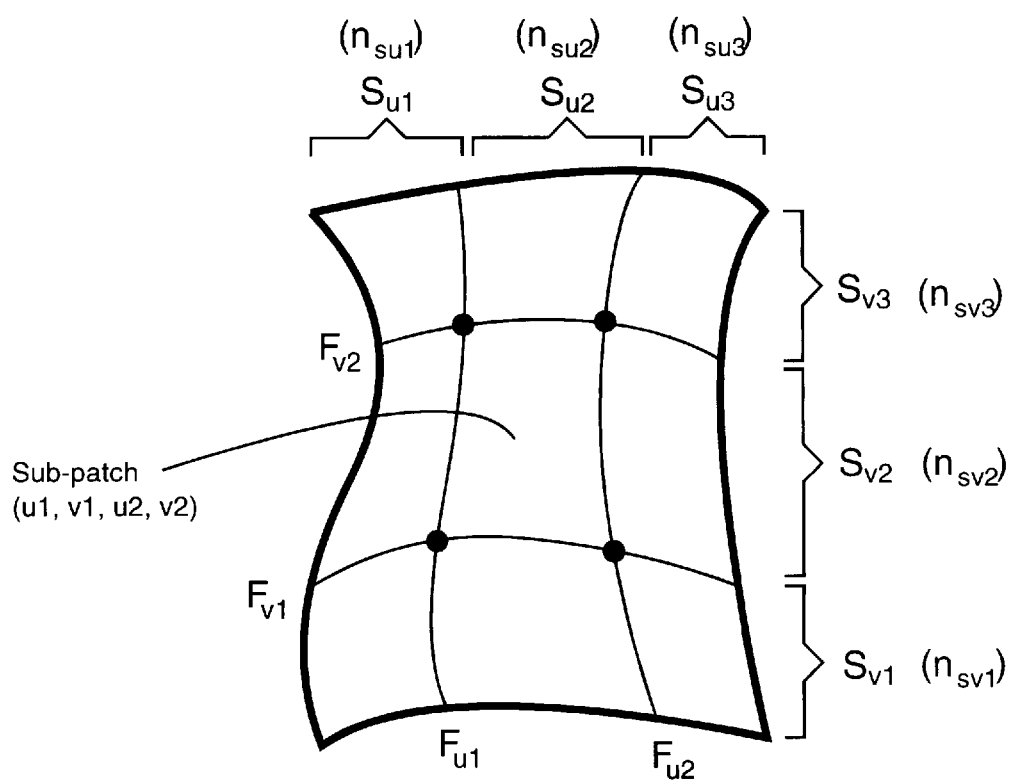
FIG. 7 shows an annotated patch that illustrates the notions of spring mesh sections and sub-patches.

These two notions are further illustrated in FIG. 7. The figure illustrates spring mesh sections and sub-patches. The polygonal patch shown here has four feature curves—two in each parametric direction. The feature curves in the u direction are labeled $F_{u1}$ and $F_{u2}$ and the feature curves in the v direction are labeled $F_{v1}$ and $F_{v2}$. The intersections of these feature curves are shown as solid circles. A spring mesh section is a set of spring points that lie in-between two adjacent feature or boundary curves. Thus the two u-feature curves $F_{u1}$ and $F_{u2}$ create three u-sections. These are labeled as $S_{u1}$, $S_{u2}$ and $S_{u3}$. Thus, for example $S_{u1}$ consists of all the spring points that lie between the boundary curve on the left and $F_{u1}$ and so on. The three v-sections created by $F_{v1}$ and $F_{v2}$ are labeled in similar fashion. The number of iso-curves in each section $S_k$ are indicated alongside as $n_{sk}$. There are 9 sub-patches created by the 4 feature curves and 4 boundary curves shown. Each sub-patch is bounded by four portions of feature or boundary curves. Sub-patches are indexed according to the u and v values of the four surrounding feature (or boundary) curves. The central sub-patch is therefore labeled in the figure as Sub-patch(u1, v1, u2, v2). For convenience we will assign the boundary curves u and v values, e.g., the boundary curve on the left is assigned the value u0, while the one on the right is assigned the value u3.

Now consider what it means for an (iso-parametric) feature curve $F_u$ to be the m-th iso-curve of the spring mesh in the u direction. For a given resolution of spring mesh what this means is that the particular set of spring mesh points that correspond to the m-th iso-curve of the spring mesh (in the u direction) must all lie on the feature curve $F_u$. As the spring mesh resolution becomes finer the spring mesh iso-curve corresponding to $F_u$ simply has more spring points. All of these spring points must continue to lie on $F_u$. With these definitions in mind, let us now consider each of our three parameterization rules in the presence of feature curves.

Modifications to the Arc-length Criterion

Figure 8:
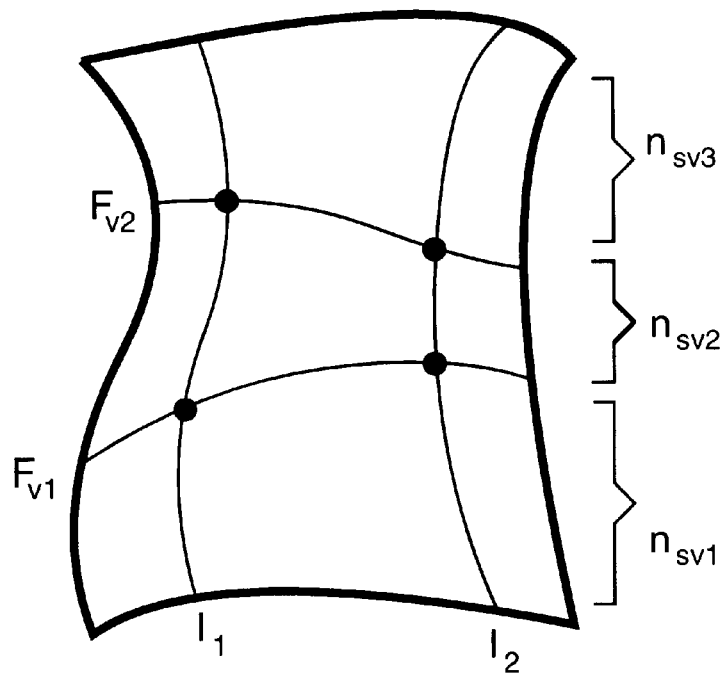
FIG. 8 shows an annotated patch that illustrates the modifications to the arc length criterion needed to account for the presence of (iso-parametric) feature curves.

FIG. 8 illustrates modifications to the arc length criterion that are needed to account for the presence of (iso-parametric) feature curves. The patch shown has two feature curves $F_{v1}$ and $F_{v2}$. The corresponding spring sections are labeled $S_{v1}$, $S_{v2}$ and $S_{v3}$ respectively. Let us assume for a moment that we have already created a satisfactory spring mesh re-sampling of this patch. Now consider two iso-curves $I_1$ and $I_2$ of the final spring mesh re-sampling as shown in the figure.

First observe that the part of $I_1$ that lies within section $S_{v1}$ has the same number of spring points as the part of $I_2$ that lies within section $S_{v1}$. Similarly, both iso-curves have the same number of spring points in the parts that lie within each of sections $S_{v2}$ and $S_{v3}$. These numbers are noted in the figure as $n_{sv1}$, $n_{sv2}$ and $n_{sv3}$, respectively.

Also observe that the number of spring points of $I_1$ within section $S_{v1}$ is independent of the number of spring points of $I_1$ within each of sections $S_{v2}$ and $S_{v3}$, i.e., the parts of a given iso-curve that lie within different sections are independent of each other. This is because each (iso-parametric) feature curve is an actual iso-curve of the spring mesh. Therefore, spring points in one section cannot cross over to neighboring sections. This observation implies that unless we choose the relative number of sample points for an iso-curve within each section, we cannot hope to maintain arc length uniformity over the entire length of the iso-curve.

Let us assume that we compute the number of sample points for each section of $I_1$ such that we have a uniform arc length distribution of spring points along $I_1$, i.e., assume we have fixed the numbers $n_{sv1}$, $n_{sv2}$ and $n_{sv3}$ such that the arc length criterion holds for $I_1$. Now, from the figure we note that the piece of $I_1$ within section $S_{v1}$ is much shorter than the piece in section $S_{v2}$. Therefore, in order for arc length uniformity to be satisfied along $I_1$, at least the following must be true:

$$n_{sv2} > n_{sv1},$$

i.e., the number of spring point of $I_1$ within $S_{v2}$ must be greater than the number of spring points of $I_1$ within $S_{v1}$.

Now using exactly the same arguments for $I_2$ as we did for $I_1$:

$$n_{sv2} < n_{sv1},$$

e., for $I_2$ to satisfy the arc length criterion, the number of spring points of $I_2$ within ction $S_{v1}$ must be greater than the number of spring points in section $S_{v2}$.

Clearly the two requirements inferred from the figure are in contradiction. This indicates that in the presence of feature curves we cannot in general satisfy our original criterion for arc length. Thus we cannot ensure that an arbitrary iso-curve will be uniformly sampled over its entire length. However, note that within a particular section we can in fact achieve a uniform arc length for each iso-curve. This observation forms the basis for our modified arc length criterion:

Arc length uniformity: the spring point spacing along a particular iso-curve should be uniform within each piece of the iso-curve that is within a spring mesh section (or sub-patch).

Note that an alternate formulation could be to allow for arc length non-uniformity within each section and blend arc length non-uniformity across feature curves. This is a useful modification for some applications and we have implemented this scheme as well. We provide the user control over the arc-length blend parameters.

Arc length uniformity (modification): the spring point spacing along a particular iso-curve should blend arc-length non-uniformity across feature curves.

Modifications to the Aspect-ratio Criterion

Figure 9:
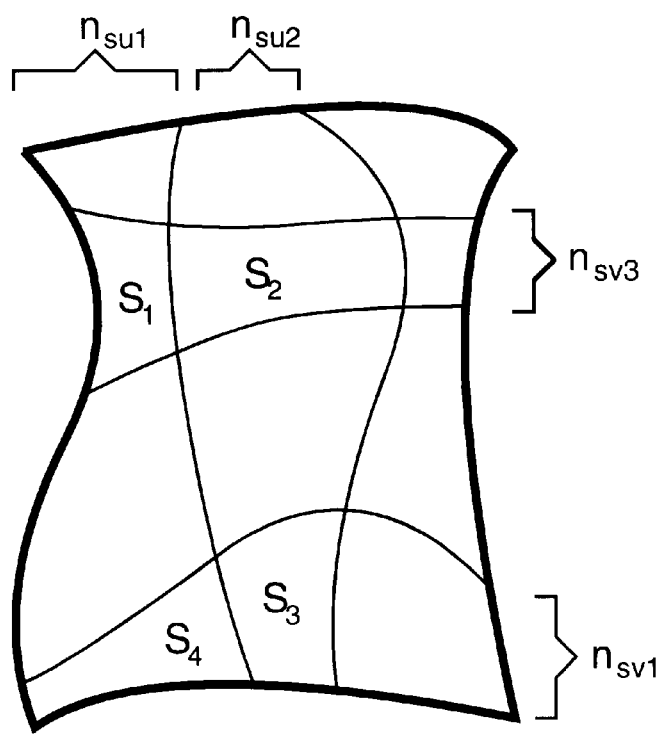
FIG. 9 shows an annotated patch that illustrates the modifications to the aspect ratio criterion needed to account for the presence of (iso-parametric) feature curves.

The parametric distortion induced by feature curves affects our aspect ratio criterion as well. In this case our original criterion is compromised by the fact that each spring mesh sub-patch dictates its own preferred aspect ratio. Since we have a tensor product parameterization these preferred aspect ratios conflict with each other. Take, for example, the patch and feature curve set shown in FIG. 9. Because of this particular set of feature curves, the aspect ratio criterion as defined earlier can no longer be satisfied. We have labeled four spring mesh sub-patches in the figure as $S_1$, $S_2$, $S_3$ and $S_4$. $S_1$ and $S_3$ are tall and thin (i.e., more resolution in the v direction) while $S_2$ and $S_4$ are short and broad (i.e., more resolution in the u direction). Since we have a tensor product parameterization $S_1$ and $S_4$ have the same number of u subdivisions, as do $S_2$ and $S_3$. These numbers are labeled as $n_{su1}$ and $n_{su2}$ respectively. Similarly, $S_1$ and $S_2$ have the same number of v subdivisions as do $S_4$ and $S_3$. These numbers are labeled $n_{sv3}$ and $n_{sv1}$, respectively. It is straightforward to show that it is not possible to satisfy the aspect ratio criteria of all four of these sub-patches. Let us assume that we were able to satisfy the aspect ratio criterion for each of the four sub-patches. Since $S_1$ is tall and thin we have the equation:

$$n_{sv3}/n_{su1} = 1 + \alpha_1, \text{ where } \alpha_1 > 0.$$

A similar argument for each of $S_2$, $S_3$ and $S_4$ gives us the following equations:

$$n_{su2}/n_{sv3} = 1 + \alpha_2, \text{ where } \alpha_2 > 0,$$

$$n_{sv1}/n_{su2} = 1 + \alpha_3, \text{ where } \alpha_3 > 0,$$

$$n_{su1}/n_{sv1} = 1 + \alpha_4, \text{ where } \alpha_4 > 0.$$

Taking a product of the left and right hand sides of these four equations gives us:

$1=\pi^4_{j=1}(1+\alpha_j)$, where $\alpha_j>0$, which is clearly a contradiction since the right hand side of the equation is strictly greater than 1.

We conclude that, in general, it is not possible to simultaneously satisfy all the aspect ratio constraints created by a set of feature curves. Unfortunately, unlike the the arc length criterion, there is no reasonable subset of the aspect ratio criterion that we can hope to satisfy. Therefore, we choose to preserve our goal of aspect ratio uniformity with the additional caveat that in general it is not possible to attain optimal aspect ratios for every single sub-patch; in other words:

Aspect ratio uniformity: the spacing along a u-iso-curve should be the same as the spacing along a v-iso-curve for every spring mesh sub-patch to the extent feasible within the constraints imposed by the feature curves.

This is a weak criterion at best and this is reflected in our implementation strategy for this criterion: we keep the decision regarding the best initial aspect ratios to the user.

Modifications to the Fairness Criterion

Figure 10:
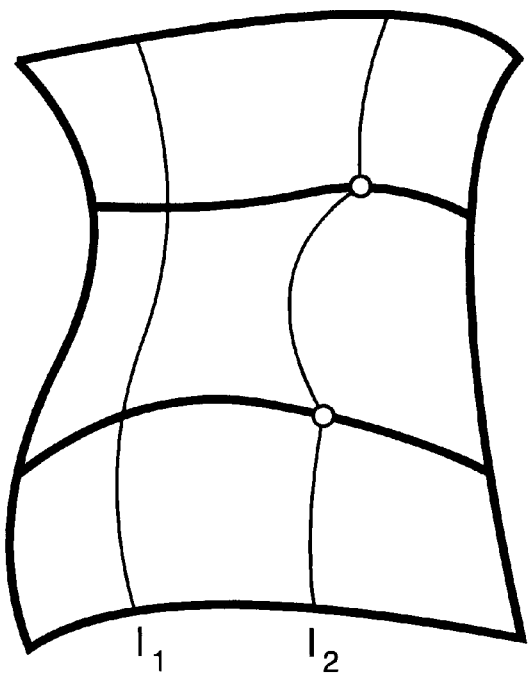
FIG. 10 shows a patch illustrating the changes to the parametric fairness criterion in the presence of feature curves.

Let us turn now to our parametric fairness criterion. Recall that this term was introduced as a regularization term to create a parametrically fair spring mesh. The term makes each iso-curve as tight (or minimal length) as possible given the other two constraints. We would like our parameterizations to always possess this property regardless of the number of constraints added. FIG. 10 illustrates the differences in the parametric fairness criterion in the presence of feature curves. If we consider any single iso-curve ($I_1$ or $I_2$ in the figure) as it passes through several sections we note that there are two kinds of fairness that we would like to ensure for the iso-curve:

1. Parametric fairness within a spring section.
2. Parametric fairness at the interface of two adjoining spring sections.

Thus $I_1$ shown in the figure is an iso-curve that satisfies both properties 1 and 2 while $I_2$ does not satisfy property 2, i.e., $I_2$ is un-fair at the juncture of two sections. Our statement of the fairness criterion, however, need not change since for an iso-curve to be of minimal length in the presence of feature curves it must automatically satisfy both of the properties above. Therefore:

Parametic fairness: Every u and v iso-curve should be of the minimum possible length given the first two criteria.

PROPAGATING ENERGY ACROSS BOUNDARY CURVES

The separation between boundary and feature curves is an artifact of our surface representation being a set of four-sided patches. The same rules that are used to relax spring meshes across feature curves may be used to relax spring meshes across boundary curves. The only noteworthy difference is that the resolution of the spring meshes across boundary curves can be different. One possible method for propagating arc-length, fairness and aspect ratio is to enforce the constraint that adjacent patches must have the same number of spring points at shared boundaries. With this constraint we can deal with boundary curves in exactly the same manner as we would feature curves. This constraint could result in some spring meshes being over-sampled, i.e., the number of spring points could far exceed the number of data points within the polygonal patch. This can happen in cases when a large polygonal patch adjoins a small polygonal patch. In practice we have not found this to be a significant irritant or inefficiency. Note that we can easily remove this constraint, for purposes of computing the various forces on the spring mesh points, by re-sampling the spring mesh section across from a boundary curve.

In the following sections we will explain our constrained relaxation algorithms in the context of (iso-parametric) feature curves with the understanding that these same techniques can be used across boundary curves as well.

FEATURE CURVES: AN IMPLEMENTATION

To summarize, we have proposed changes to each of our three parameterization rules in the presence of (iso-parametric) feature curves (or across boundary curves). The changes are:

The arc length criterion holds within a spring section but not globally. The spring-point spacing along a particular iso-curve blends arc-length non-uniformity across feature curves.

The aspect ratio criterion has been weakened to state that the criterion holds only where it is feasible (given the constraints imposed by the feature curves).

The parametric fairness criterion stays the same as before. The main difference is that our implementation must consider fairness both within a spring section as well as at the interface of two adjoining spring sections.

From an implementation perspective each spring mesh sub-patch essentially behaves like an independent patch except for the parametric fairness constraint which is propagated across feature curves to neighboring sub-patches. Intuitively then, feature curves act as semi-permeable patch boundaries that only let the parametric fairness criterion through to neighboring sections.

In this section we describe modifications to our earlier coarse-to-fine parameterization strategy in the presence of feature curves. Our discussion is in four parts. First, we discuss changes to fundamental spring point data structures to accommodate feature curves. Second, we discuss how to initialize a spring mesh based on a set of feature curves. Third, we examine the modifications to the spring mesh relaxation process. Finally, we explain the changes to our spring mesh subdivision step.

Data Structure Changes

Figure 11:
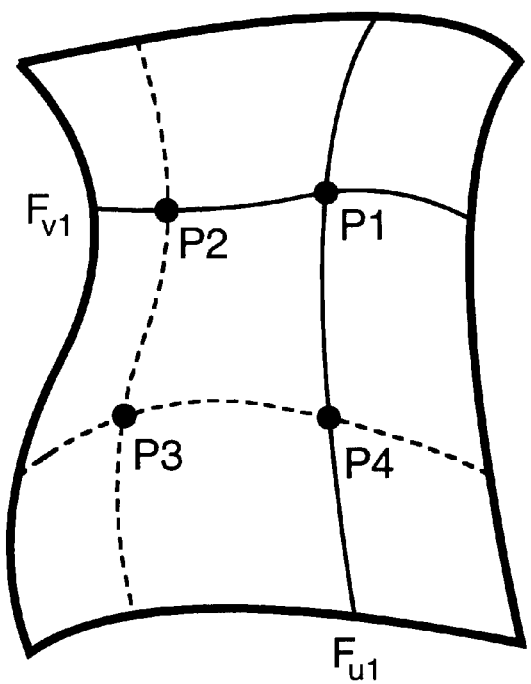
FIG. 11 shows an annotated patch illustrating two new kinds of spring points that are introduced to accommodate feature curves.

Thus far, the only constraint on our spring points was that they should lie on the surface of the polygonal mesh, i.e., a spring point was just a face-point. With the addition of feature curves, additional constraints must be imposed on spring points. These changes merely account for those spring points that are either constrained to feature curves or lie at the intersection of two feature curves. FIG. 11 illustrates data structure changes used to accommodate feature curves. The figure shows the two new kinds of spring points that are introduced to accommodate feature curves. First, the anchor points: points that lie at the intersection of two feature curves. They are never moved during our relaxation process. P1 is an example of an anchor point. The second kind of point introduced are the curve-points: these are points that are constrained to lie on a feature curve. P2 and P4 are curve points. P3 represents an example of a regular face-point.

Consider the face-points that lie at the intersection of two feature curves. Since each of the feature curves eventually corresponds to an iso-curve of the spring mesh, the intersection of two curves must correspond to a spring point. Since the feature curves do not shift position during the parameterization procedure, neither does this intersection spring point. We call such immovable spring points anchors or anchor spring points. Note that all spring points that lie on boundary curves are effectively anchors since they never move during relaxation.

Now consider those spring points that lie on a feature curve but not at the intersection of two features. These points are constrained to stay on the feature curve at all times during the relaxation procedure. We call these points curve spring points or curve points. In the figure $P_2$ and $P_3$ are curve points. We will find it useful to define a function MovePointOnCurve for the curve-points. We will use this operation on curve-points much like we used MovePointOnSurface on face-points earlier.

Finally, there are spring points that are not directly affected by the feature curve constraint. These are exactly the points of the spring mesh that are not anchors or curve points. $P_3$ in the figure is one such point. These points behave exactly as they did in our original unconstrained re-sampling strategy. With these simple change to our basic data structures let us now examine how to initialize, relax and subdivide feature curve enhanced spring meshes.

Initializing the Spring Mesh

Our initialization procedure is split into two steps. In the first step we create a spring mesh that is based on just the anchor points of the spring mesh. This is found by computing the intersections of all pairs of u and v feature curves. This initial spring mesh might not meet the requirements of the aspect ratio criterion. Therefore, in the second step we subdivide the initial spring mesh from the first step to achieve a satisfactory aspect ratio.

Our first step is to compute the intersections of each feature (and boundary) curve in the u direction with each feature (and boundary) curve in the v direction. These spring points are all anchors and constitute our initial spring mesh. Let us consider one of these computations, i.e., the intersection of two feature curves; one each in the u and v directions. Given a pair of any two surface curves, they may intersect in an arbitrary number of points. The intersections might include complex cases such as tangential intersections. However, we are concerned with a much simpler problem. In our case, the two surface curves are iso-parametric curves in the u and v directions, respectively, and usually have one well-defined intersection. In a tensor product parameterization every single u iso-curve must intersect every v iso-curve in at least one point.

Given two feature curves $F_u$ and $F_v$, procedure IntersectSurfaceCurves($F_u$, $F_v$) finds a face-point $P_{uv}$ that lies on both feature curves. Recall that all our surface curves are represented as face-point curves. Therefore, procedure IntersectSurfaceCurves must compute the intersection of two face-point curves. Note that these curves need not have any face-points in common even if the surface curves they represent (i.e., sample) do in fact intersect. Even a linear (or higher order) reconstruction of the face-point curves is not guaranteed to intersect in an exact, mathematical sense. Therefore, a reasonable implementation of the procedure might be to find a point on a linear re-construction of the first face-point curve that is closest in $\mathbb{R}^3$ to a linear re-construction of the second face-point curve. However, note that this implementation could yield incorrect results in pathological cases, e.g., if the face-point curves are close together at certain points in space even though at those points they are widely separated on the surface. To alleviate this problem we restrict our closest point computation between the face-point curves to an intersection neighborhood on each face-point curve. The intersection neighborhood is computed as follows. First, we compute graph paths corresponding to each surface curve by chaining together a sequence of vertices that are each closest to consecutive face-points on the curve. Since the feature curves follow the two iso-parametric directions, they cross each other on the surface. Therefore, the computed graph paths for the feature curves intersect at a mesh vertex. On each curve, we use as our intersection neighborhood a small (constant size) set of face-points in the neighborhood of the face-point on that curve that corresponds to the mesh vertex.

An initial spring mesh that is based on just the intersection of the feature curves may not satisfy our aspect ratio criterion. Since our subdivision step uniformly subdivides our spring mesh, the initial aspect ratio will be preserved in the final spring mesh. The second step of our initialization process is to subdivide the spring mesh sections to achieve a better initial aspect ratio. As we observed earlier, it is not in general possible to satisfy our aspect ratio criterion globally. In fact the user might desire a distorted aspect ratio in the first place. For these reasons we allow the user to supervise this second stage of the initialization process. In our system, we allow the user to selectively subdivide spring mesh sections to attain a desirable initial aspect ratio.

Relaxing the Spring Mesh

The goal of our relaxation step is the same as before: to re-distribute spring points on the surface such that our criteria of arc length and parametric fairness are met. As before, we achieve this goal by first computing forces on individual spring points (based on the parameterization rules) and second by using these forces to move the points over the mesh surface. The equilibrium position of the spring points minimizes the resultant forces due to our rules and therefore represents the desired minimal energy spring mesh.

Anchor points by definition do not move during the relaxation procedure. Let us consider the relaxation based forces for the other two kinds of face-points: regular spring points and curve-points.

Relaxation for regular spring points remains exactly the same as before. These are the points that are completely within a spring sub-patch. Since all forces are computed locally, these points do not interact directly with the spring points of other spring sub-patches. They interact with one or more of the other spring points in the same spring sub-patch or with the anchors or curve-points on bounding feature (or boundary) curves. In both cases, the forces on a regular spring points may be computed in exactly the same fashion as they were earlier.

Figure 12A:
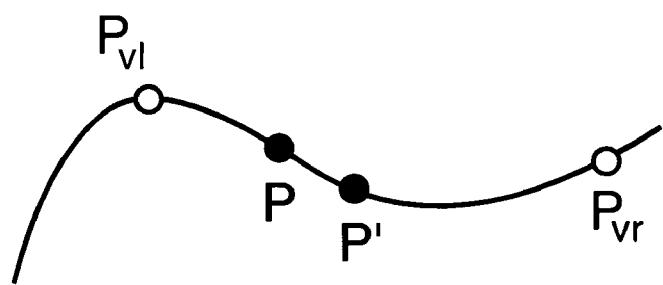
FIGS. 12A and 12B illustrate how relaxation forces are computed during parameterization.

Let us now consider the curve-points. By definition these points are constrained to lie on the feature curves. Therefore, any forces on them will move them only on the feature curve itself. As mentioned earlier feature curves act as semi-permeable boundaries: they propagate fairness across neighboring sub-patches but not arc length. There are two kinds of forces acting on the curve-point: a force based on parametric fairness and a force based on arc length. To illustrate how these forces are computed let us consider the curve-point P shown in FIGS. 12A and 12B. As shown in FIG. 12A, P is constrained to lie (or move) on a v iso-curve $F_v$. The two neighbors of P along the feature curve are labeled $P_{vl}$ and $P_{vr}$. Since P, $P_{vl}$ and $P_{vr}$ are all constrained to a fixed feature curve $F_v$ it does not make sense to impose a fairness constraint on P based on $P_{vl}$ and $P_{vr}$. This is because we cannot hope to make the the iso-curve of the spring mesh that corresponds to $F_v$ any "tighter" than $F_v$ itself. Therefore these two neighbors of P are used only in arc length computations. The final position of P due to arc length forces is shown in the figure as P'.

Figure 12B:
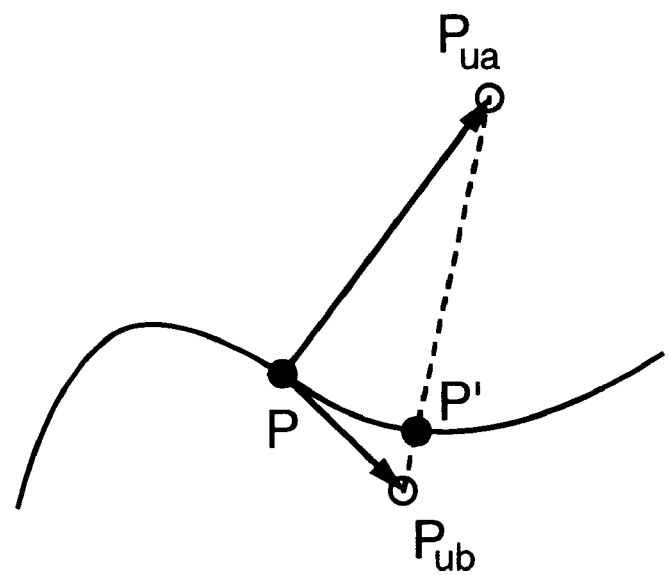

Now consider the two neighbors of P in the other iso-parametric direction, labeled $P_{ua}$ and $P_{ub}$ in FIG. 12B. Since P lies on a feature curve, these points belong to different spring mesh sections (and therefore sub-patches). Recall that feature curves are impermeable to the arc length constraint, i.e., arc-length uniformity is not maintained across a feature curve. Therefore these two neighbors of P are not used for arc length computations. We use them only for the fairness computation. The final position of the point P due to fairness forces is shown in the figure as P".

To summarize, $P_{ua}$ and $P_{ub}$ are used to compute the parametric fairness based force and $P_{vl}$ and $P_{vr}$ are used to compute the arc length based force on P. The resultant of these two forces moves P to a new position along the feature curve $F_v$. Let us turn now to the computations of these forces.

As shown in FIG. 12A, the arc length force should move the curve-point P along the feature curve $F_u$ to a new point P' that lies at the mid-point, on the curve, of $P_{ul}$ and $P_{ur}$. The arc length force on P is therefore computed as follows. Let $L_F(P_1, P_2)$ be a function that returns the arc length between two points $P_1$ and $P_2$ on a feature curve F. If $v_t$ represents the tangent vector at P, then the arc length force on P is given by:

$$F_{arc} = (L_{Fu}(P_{ur}, P) - L_{Fu}(P, P_{ul})) v_t.$$

The goal of the parametric fairness based force now is to ensure that the iso-curve on which P, $P_{ua}$ and $P_{ub}$ lie is as fair (or "tight") as possible. This will occur when the three points are as close to being in a straight line on the surface as possible. An example of a final state of P based on the fairness force is indicated in FIG. 12B by P". To compute the fairness force, we must first define the forces on P due to each of $P_{ua}$ and $P_{ub}$. These are defined as:

$$F_{up} = P_{ua} - P$$

and $$F_{down} = P_{ub} - P.$$

The vectors defined above do not in general lie on the surface tangent plane at P. Let the corresponding vectors that are projected to the tangent plane at P be $F^t_{up}$ and $F^t_{down}$. Since the arc length constraint is not propagated across feature curves, we are not concerned with the actual lengths of these vectors. Examining the desired rest position of P on the curve $F_u$ we find that if the unit vectors in the directions corresponding to the two forces defined earlier face in opposite directions, our fairness criterion will be satisfied. Accordingly if we let the resultant of these vectors on the tangent plane at P be:

$$F^t_{fair} = F^t_{up}/\|F^t_{up}\| + F^t_{down}/\|F^t_{down}\|$$

and the fairness criterion is given by $$F_{fair} = (F^t_{fair} \cdot v_t) v_t,$$

where $v_t$ once again is the tangent to the curve at P.

Thus the fairness and arc length based forces pull the curve-point P in potentially different directions along the iso-curve $F_v$. The resultant force on P is given by a weighted combination of $F_{arc}$ and $F_{fair}$:

$$F_{result} = \alpha_{curv} F_{arc} + \beta_{curv} F_{fair}.$$

In practice when our relaxation iteration starts the points are re-distributed predominantly according to the arc length criterion (i.e., $\alpha_{curv}=1$ and $\beta_{curv}=0$). As the relaxation progresses progresses the fairness criterion is given increasing weight (i.e., $\alpha_{curv}=0$ and $\beta_{curv}=1$). This simple strategy yields satisfactory results. We have found it useful to supply the user with the option to interactively vary the relative weights of $\alpha_{curv}$ and $\beta_{curv}$ during the relaxation process.

Spring Mesh Subdivision

Spring mesh subdivision in the presence of feature curves is a straightforward extension of our earlier subdivision process. Feature curves provide additional flexibility in that a user can selectively subdivide individual sections of the patch and not affect other sections in the process. Note that it is not possible to subdivide an arbitrary spring sub-patch because our spring mesh is a regular grid. To uniformly subdivide a sub-patch in both directions we must subdivide both sections to which the sub-patch belongs. This is an inherent limitation of the non-hierarchical representation of the spring mesh and of a tensor product B-spline surface rather than a limitation of the techniques explained herein.

The subdivision process proceeds in much the same way as already explained above. The one new case we encounter with feature curves is the subdivision of an iso-curve that corresponds to a feature curve. This requires us to find the mid-point of each pair of adjacent curve-points that lie on the same feature curve. This is accomplished simply by finding a new spring point that lies at the mid-point on the feature-curve of the two original spring points.

The ability to selectively subdivide each spring mesh section allows the user to selectively refine regions of the mesh where more spring points might be needed. Since the fitted spline surfaces closely follow the underlying spring mesh this effectively allows the user to place more spline iso-curves in any section. It is worth noting that the region a user chooses to selectively subdivide does not necessarily have to be geometrically complex or dense. Take for example the spline control meshes of human (or humanoid) faces that are generated for animation. Even geometrically simple regions such as the eye socket or the region around the mouth are often represented using a dense control mesh to provide for convincing facial expressions. Thus the choice of which region to selectively subdivide is often domain dependant and is better determined by the user than by an automated algorithm.

FLOW CURVES

We define a flow curve as a feature curve on the polygonal mesh that is partially or fully contained within a polygonal patch, and that loosely guides the parameterization of the polygonal patch. This functionality is useful when the user wishes to control the parameterization without limiting the iso-cuves to exactly follow the feature curves, as is the case with iso-parametric feature curves described above. It is worth noting that since the parameterization of a patch can affect the parameterization of neighboring patches (since boundary curves can propagate relaxation) a flow curve (like an iso-parametric feature curve) can have a (direct or indirect) effect on the global parameterization of the mesh.

Flow curves are surface curves and can be created by interactive painting on the polygonal mesh, or through one of a number of automated schemes based on surface properties such as dihedral angles of the polygonal mesh, or curvature variation of the surface.

During the parameterization process, flow curves exert a force (called the flow-force) on the spring points of the spring mesh that are in their vicinity. Thus the resulting spring mesh loosely follows the flow curve. The greater the flow-force the greater the influence the flow curve has on the final parameterization. Thus flow curves are not isoparametric curves of the parameterization; rather, they are weaker constraints that just dictate the flow of isoparametric curves of the spring mesh rather than specify their exact location.

Within our system the user controls the magnitude of the flow-force. This is useful when the user wishes to experiment with the kinds of results generated using different flow-forces. However, automated schemes may also be used to set the magnitude of the flow force.

As discussed in previous sections, a useful interpretation of our spring meshes is as a smooth blend on the surface of boundary and (iso-parametric) feature curves. In the presence of flow curves, this interpretation easily extends itself to include flow curves, i.e., the spring meshes may be thought of as a smooth blend on the surface of boundary, iso-parametric feature curves and flow curves such that it interpolates the boundary and iso-parametric feature curves and approximates the flow curves.

Using Flow Curves to Guide Spring Relaxation

Unlike iso-parametric feature curves, flow curves do not modify the fairness or arc-length forces within the spring mesh relaxation framework. Rather they impose additional forces on the spring mesh points in their vicinity. To implement flow curves we will need to first define some terminology.

Figure 13A:
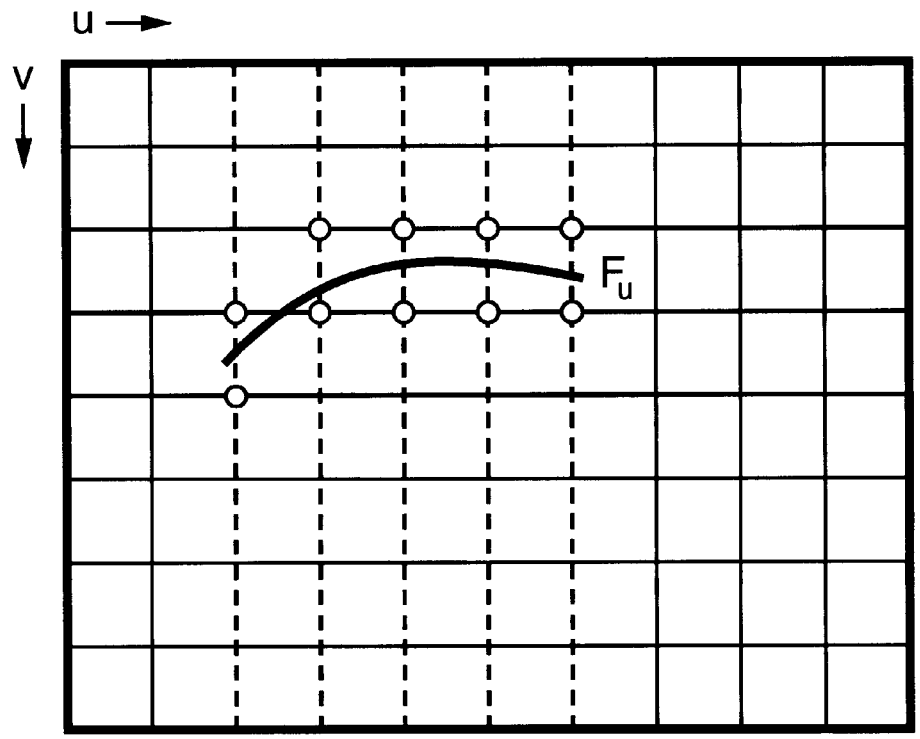
FIGS. 13A and 13B show how a flow curve $F_u$ guides the iso-curves of a parameterization.
Figure 13B:
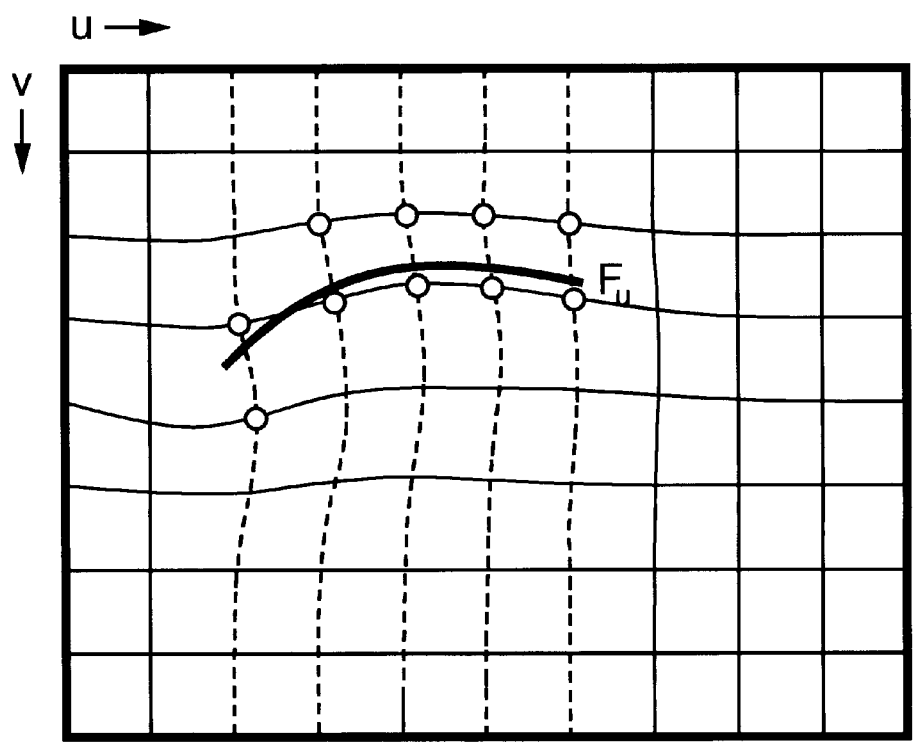

FIGS. 13A and 13B show a flow curve $F_u$ and the u and v directions of a spring mesh before and after the flow curve has influenced the spring relaxation. The subscript u indicates that the flow curve is principally along the u direction. The v iso-curves that cross the flow curve $F_u$ (indicated in the figure by dashed lines) are called the directly influenced iso-curves (or simply DI iso-curves). The spring points along the DI iso-curves that are nearest to the flow curve $F_u$ (indicated in the figure by circles) are called the maximally influenced spring points (or simply MI spring points). Given a spring mesh and a flow curve, the flow force affects only the spring points along the DI iso-curves. Furthermore, the flow force decreases with distance from the MI spring points.

Principal direction of a flow curve: Every flow curve is interpreted to be aligned in either the u or the v direction. This direction determines the way a flow curve will affect the parameterization. A flow curve in the u (v) direction will attract the u (v) iso-curves into being parallel to itself and attract the v (u) iso-curves to be perpendicular to itself.

Directly influenced iso-curves (DI iso-curves): Those iso-curves of the spring mesh that are not in the principle direction of the flow curve and that intersect the flow curve.

Maximally influenced spring points (MI spring points): The spring points along each DI iso-curve that are parametrically closest to the flow curve. These spring points are always in pairs. Usually a DI iso-curve intersects a flow curve only once. In this case there are exactly two MI spring points. Note that the final spring mesh should have exactly two MI spring points per DI iso-curve. Finally, in our system, if a flow curve is too complex the user is prompted to split the flow curve into multiple flows.

Flow adjacency information: A collection of objects comprising a list of DI iso-curves and the MI spring points for each of these iso-curves.

Parameterization in the presence of flow curves uses a coarse-to-fine relaxation strategy as described above in relation to iso-parametric feature curves. The initialization step is modified to compute the flow adjacency information. The relaxation step is modified to take into account the flow force in addition to the arc-length and fairness forces. The relaxation step also updates the flow adjacency information as needed. Finally, the subdivision step is modified to update the flow adjacency information. We explain each step in detail in the following sections.

Modifications to the Initialization Step

The initial u and v iso-curves are determined as with iso-parametric feature curves by using a graph search algorithm, e.g., Dijkstra's algorithm. Based on the principal direction of a flow curve, the iso-curves in the other direction are intersected with the flow curve. For this purpose we can use the same intersection algorithm that we used to determine the intersection of two iso-parametric feature curves. Note that a single algorithm is used to determine both the DI iso-curves and the MI spring points on those iso-curves.

As mentioned earlier, if the flow curve is very complex there could be multiple MI spring point pairs for a specific DI iso-curve. We compute all pairs of Ml spring points in these cases. Furthermore, when the spring mesh is coarse (e.g., at the start of a coarse-to-fine relaxation step) the region between two MI spring points could intersect the flow curve multiple times. In this case we simply choose the first of these intersections. As the sampling density of the springs increases the relaxation and subdivision step update the flow adjacency information.

Modifications to the Relaxation Step

Figure 14:
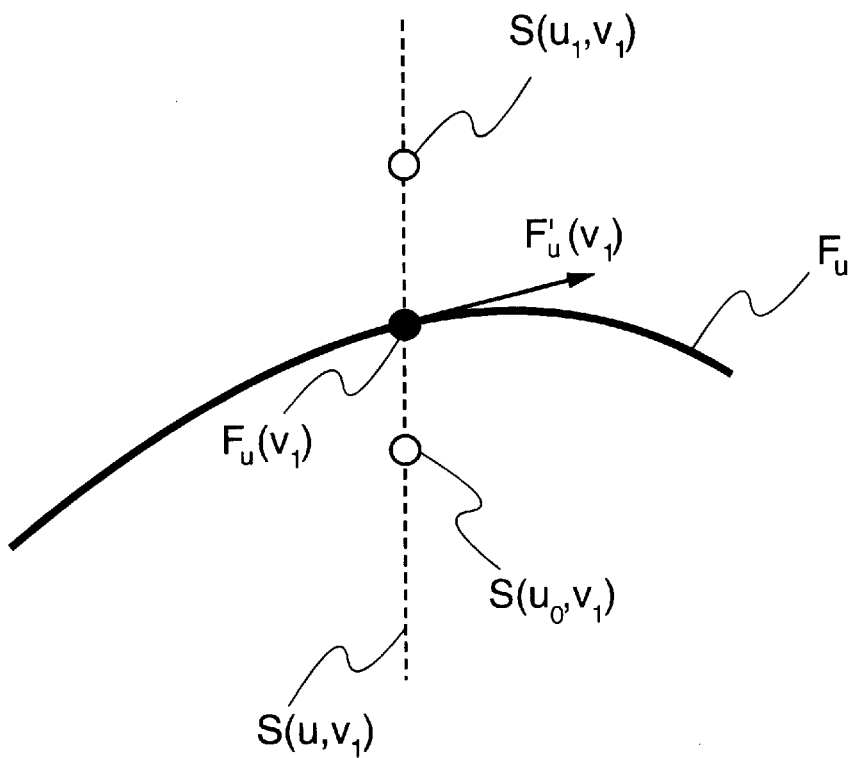
FIG. 14 shows how relaxation forces are computed near a flow curve $F_u$.

FIG. 14 shows a flow curve $F_u$ whose principal direction is u, and a specific DI iso-curve $S(u, v_1)$ that intersects this flow curve. The figure also shows the two MI spring points $S(u_0, v_1)$ and $S(u_1, v_1)$ corresponding to the iso-curve $S(u, v_1)$. The resultant forces (i.e., Force $(u_0, v_1)$ and Force $(u_0, v_1)$, respectively) on each of these points due to the flow forces are computed as follows:

$$\text{Force }(u_0,v_1)=\text{Force }(u_0,v_1)+\alpha[S'_v(u_0,v_1)\cdot F'_u(v_1)]F'_u(v_1)$$

and $$\text{Force }(u_1,v_1)=\text{Force }(u_1,v_1)-\alpha[S'_v(u_1,v_1)\cdot F'_u(v_1)]F'_u(v_1)$$

Where $F'_u(v_1)$ is the tangent (unit vector) to the flow curve $F_u$ at the point $F_u(v_1)$ where the DI iso-curve $S(u, v_1)$ intersects the flow curve, and $S'_v$ refers to the derivative (unit vector) of the mesh S along the direction v. The term $\alpha$ is a weighting function that is used to determine the relative strength of the flow curve compared with other forces on the spring zmesh points. A similar expression can be derived for a flow curve which runs along the v direction. The spring mesh derivative is evaluated in a direction consistent with the flow curves, e.g., the forward direction in both cases. Note that this expression can be interpreted as a shearing force on the MI spring points.

This additional force on the MI spring points make the spring mesh iso-curve next to the flow curve conform locally to the flow curve. The iso-curves that are farther from the flow curve are affected indirectly by neighboring spring points. In practice, we have found that influencing these farther iso-curves using the flow curve helps faster convergence of the relaxation process. We use a similar but weaker force to the one above for spring points along the DI iso-curves that are farther from the flow curve. The force on a specific spring point along a DI iso-curve is thus weighted by a fall-off function that is inversely proportional to the parametric distance d of the iso-curves in the same principal direction as the flow curve. Thus:

$$\text{Force }(u_d,v_1)=\text{Force }(u_d,v_1)+\beta(d)\alpha[S'_v(u_d,v_1)\cdot F'_u(v_1)]F'_u(v_1)$$

The magnitude of the fall-off function $\beta$ is inversely proportional to the parametric distance d of the spring point $S(u_d, v_1)$. Other weighting schemes might be suitable as well. We have found that this particular scheme works well even in the presence of multiple flow curves.

Note that after each relaxation step the flow adjacency information must be updated since both the DI iso-curves and the MI spring points could change as a result of the relaxation step. Both these computations are performed using local operations. Since the DI iso-curves are contiguous to each other, new DI iso-curves are added before the first or after the lasts DI iso-curve. Similarly, DI iso-curves are removed starting from the first or the last DI iso-curve. In either case, the obvious algorithm works well, i.e., step through DI iso-curves sequentially on either side of and including the first and the last DI iso-curve until the flow adjacency information has been updated. The MI spring points are easily updated by examining whether the intersection of the DI iso-curves lies between the MI spring points. If it does not, the MI spring points are updated.

Modifications to the Subdivision Step

When the spring mesh is subdivided flow adjacency information must be updated as well. One method for updating this information is the brute force approach, i.e., to compute it from scratch using a method similar to the one used at spring mesh initialization. In the presence of a large number of flow curves some additional computational efficiency can be achieved by using an incremental update method. This method starts with the set of DI iso-curves at the previous subdivision level and adds or removes iso-curves to this set on a smaller number of iso-curve to flow curve computations.

FEATURE CURVES: DISCUSSION

Although it is possible to create poor parameterizations using feature curves, the principal benefits of our parameterization strategy continue to hold true in the presence of feature curves. In addition, the user can create complex and yet high quality parameterizations of an object by specifying just a few constraints. For example, an automatically generated spring mesh with no feature curve constraints typically will have parameter lines that do not follow the natural features of the object. In particular, in certain regions the geometrical features of the object can run diagonal to the two principal directions of the parameterization. Modifying the geometry of the object using this parameterization would be very unwieldy. Feature curves specified on the polygonal patch to guide the parameterization accomplish two goals. First, the spring mesh follows the geometrical shape of the object's features. As a result, the user can easily control and edit the geometry of the object by manipulating a single (or a few adjacent) iso-parametric curves. Second, adjacent feature curves can be used to generate a denser set of samples in the region around the object's features. This change gives the user greater control (more iso-parametric lines) over the geometry of the object. Similar results can be obtained by using non-iso-parametric feature curves (i.e., flow curves) that follow the features of the object. The key difference in the case of flow curves is that although the spring mesh is attracted to and follows the flow curve, the flow curve does not correspond to any specific spring mesh iso-curve. This is a useful aspect of our algorithm when the user is not concerned about the precise placement of iso-curves but nevertheless wants the iso-curves to loosely follow certain geometric features.

A variational Perspective of our Parameterization Algorithm

A useful property of feature curves is that a user specifies only those constraints that are important in their application. The rest of the parameterization is "filled in" automatically, interpolating or approximating those constraints with a minimum energy (i.e., minimum distortion) spring mesh. In this sense, our parameterization strategy is similar in philosophy to variational (or free-form) surface design where a minimum energy surface geometry is automatically computed given a small set of user-specified constraints. In our pipeline, the geometry of the surface is always constrained to approximate the original polygon mesh; it is instead the parameterization of each patch which is computed to satisfy user-specified constraints. From this perspective, our parameterization problem may be viewed as a variational parameterization design problem and our specific spring mesh based solution may be viewed as a finite difference solution to this design problem.

Results

In this description we presented a robust and efficient parameterization algorithm for irregular polygonal patches. The first notable aspect of parameterizations generated by the present technique is the fidelity of our final spring mesh to the original polygonal model. The triangular reconstruction of our spring mesh is indistinguishable from the original polygonal data. The second notable aspect about the parameterizations is the rapidity with which the parameterizations are created. An input surface having about 350,000 polygons and 104 patches requires just a few minutes to perform the final gridded re-sampling.

Typically, the precise positioning of boundary and feature curves takes significantly more time than the actual parameterization process itself.

A third notable aspect about the parameterizations is that they are constructed in an interactive environment. Our algorithm's coarse-to-fine relaxation strategy was invaluable in this environment. The modeler can pause the relaxation at a coarser resolution and make modifications to the input (such as modifying boundary curves or adding feature curves) and preview results at interactive speeds. This dynamic user interaction would not have been possible with a static (i.e., slow) parameterization scheme.

The ability to interpolate a few (important) iso-parametric feature curves, approximate a few flow curves and automatically fill in the rest of the spring mesh, is a unique and useful ability of our parameterization algorithm. For example, feature curves are very useful when constructed to meet the needs of an animation. In this case, feature curves are specified to match certain anatomical characteristics of the model. Typically, only a few key feature curves are needed to specify the required parameterization. Our feature driven parameterization algorithm automatically creates a parameterization that interpolates these feature constraints.

CREATING AN APPROXIMATION-SPRING-MESH

As explained earlier, our surface approximation consists of three steps. The first is a parameterization step which establishes a surface grid called a spring mesh, for each polygonal patch. The spring mesh always lies exactly on the surface of the polygonal mesh. In the second step we create an approximation-spring-mesh (or approximation-mesh) from the spring mesh. This approximation-mesh is then used as an input for the third and final step which is a least squares spline surface fitting step.

For those cases where the user desires full fidelity to the original data-set, the approximation-mesh is exactly identical to the spring mesh. In such cases, the fidelity value is everywhere 1. Consequently,creating the approximation-mesh is a trivial operation (it is identical to the spring mesh) and we can move directly to the least squares fitting step.

When the fidelity value is less than 1 along parts of the polygonal mesh, the approximation-mesh differs from the spring mesh in that some of the points of the approximation-mesh float freely above the surface of the polygonal mesh.

The approximation-mesh is created in two steps. In the first step it is initialized. In the second step it is relaxed in a similar fashion to the spring mesh taking into account internal energies of the mesh as well as fidelity to the spring mesh surface. We describe each of these steps below. The approximation-mesh is initialized simply as a copy of the spring mesh. There is a one-to-one correspondence of a point on the approximation-mesh to a point on the spring mesh.

Relaxing the Approximation-mesh

Figure 15:
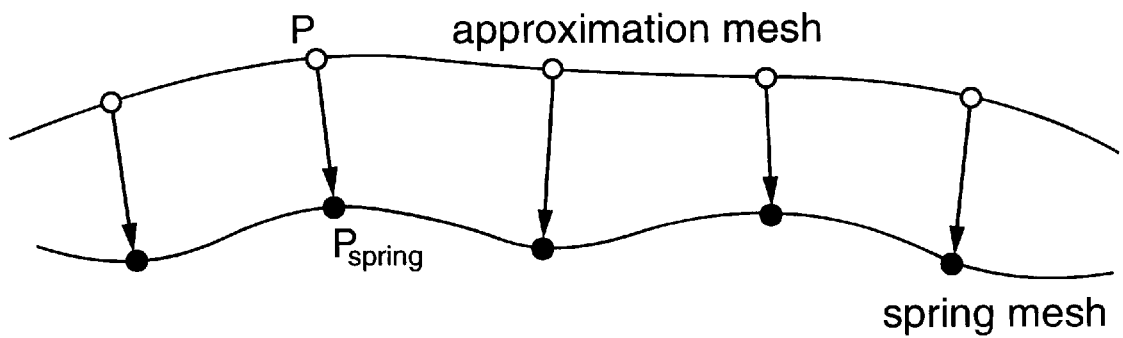
FIG. 15 illustrates an approximation mesh (top curve) corresponding to an underlying spring mesh (bottom curve).

The approximation-mesh relaxation step is similar to the spring mesh relaxation step, in that the same internal forces of fairness and arc-length are used to move the points. The key difference is that the approximation-mesh points can move off the surface. FIG. 15 illustrates an approximation mesh (top curve) corresponding to an underlying spring mesh (bottom curve). For each approximation-mesh point (shown as circles) we add an additional force that is given by a weighted vector joining the approximation-mesh point's position in space to its corresponding spring point in the spring mesh (shown as solid dots). If we consider a point p of the approximation-mesh, the additional fidelity-based force on this point is given by:

$$F_{fidelity}(P) = \alpha(1-\phi)(P_{sring}-P)$$

Where $P_{spring}$ is the point on the spring mesh that corresponds to the point p of the approximation mesh. The coefficient $\alpha$ is a weighting factor and $\phi$ is the fidelity value at the spring point $P_{spring}$. Note that fidelity values at points of the spring mesh are easily determined from fidelity values on the polygonal mesh surface: each spring point lies exactly on a face of the polygonal mesh. Each of the vertices of this face have fidelity values assigned to them (1 by default). The fidelity value at the spring point is simply a linear combination of the weights at the vertices of the face it lies on. The weights are given by the barycentric coordinates of the spring point.

Note that if the fidelity value is 1, the forces on the approximation-mesh due to the fidelity metric are zero. In this case the approximation-mesh points are identical to the spring points.

Note that we create the approximation mesh only once the final spring mesh has already been created (i.e., when the coarse-to-fine relaxation process is completed). As pointed out earlier, we do this for reasons of simplicity of user interface. Using a method that is a straightforward extension to the one outlined above, the approximation mesh could be created simultaneously with the spring mesh during the coarse-to-fine relaxation process. This might be useful in instances where the approximation mesh deviates substantially from the spring mesh.

SPLINE SURFACE FITTING

Once our input polygon mesh has been parameterized, the next step in our pipeline is to fit a combination of spline surfaces and displacement maps to the parameterized surface. As explained earlier, the spline surface captures the coarse geometry of the surface while the displacement map captures fine detail. The resolution of the spline surface is chosen by the user and both the spline surface and the associated displacement map are automatically determined based on this resolution. In this section we devote ourselves to the discussion of how the B-spline surface fit is obtained once the polygonal patch has been parameterized. We discuss the computation of displacement maps in the next section.

Once we have generated the final approximation-meshes we could use them in one of two ways: first, we could use the approximation-mesh to assign parameter values to mesh vertices, assign weights to the mesh vertices based on the fidelity values, and proceed with a traditional non-linear optimization strategy to fit to the mesh vertices (we would have to use the non-linear optimization strategy since the mesh vertices are distributed irregularly on the polygonal surface). A second approach is to fit our surfaces directly to the approximation-mesh. As explained eariler we have chosen to use the second approach, i.e., we fit our B-spline surfaces directly to the approximation-mesh. We are more interested in an approximation to the mesh surface itself rather than just the mesh vertices. As such if the spring mesh is a faithful re-sampling of the polygonal surface then fitting to the spring points does not compromise the quality of our fitted B-spline surface. In those instances when the highest fidelity of fit is required (i.e., fidelity values are all 1) the approximation-mesh is identical to the spring mesh. And, as the results from the previous discussion demonstrate, our spring meshes do in fact satisfy the requirements for surface fitting. Furthermore, as explained earlier, fitting to the spring mesh is computationally more efficient. Thus, when the highest possible fidelity of fit is required fitting to the approximation mesh does not compromise the quality of the fitted B-spline surface.

In those cases where variable fidelity of fit is required the approximation-mesh captures the user's requirements for the desired level of fidelity to the polygon mesh. Thus, in this case as well, fitting to the approximation mesh does not compromise the quality of the fitted B-spline surface.

The discussion below describes how we obtain a B-spline fit of a given (user specified) resolution from our approximation-mesh. We begin by first characterizing our approximation measure. In particular we address the issue of what it means for a B-spline surface to reasonably approximate a set of data points. We then discusses our specific surface fitting implementation and conclude with some results of our surface fitting algorithm and discuss its useful properties in an interactive setting.

Characterizing an Approximation Measure

In the preferred embodiment, our fitting function is a uniform tensor product B-spline surface of a fixed, user specified resolution. The data set we are fitting to is the approximation-mesh which is a regular grid. The goal of the fitting process is to assign positions in $\mathbb{R}^3$ to the B-spline surface control vertices such that the resulting spline surface is a reasonable approximation to the approximation-mesh. As such there are several approximation strategies that could meet this criterion.

A simple strategy is to sub-sample the approximation-mesh points and use these as the edit points of a B-spline surface. This is clearly some kind of approximation to the spring points. However, it is a poor one. Signal processing theory suggests that sub-sampling and reconstruction (in our case tensor product B-spline reconstruction) of a data set can produce an aliased version of the surface that the data set is meant to represent. Of course, there are reasonable strategies in the signal processing literature that overcome such aliasing problems and these could be applied to alleviate the problems with this simplistic solution. However, such modifications involve smoothing out the approximation-mesh, potentially losing surface detail that would otherwise have been captured by the spline surface. Therefore such a strategy is not acceptable to us.

Instead we seek a B-spline surface output that represents the best possible approximation to the approximation-mesh for a given input control vertex resolution. In other words we would like our fitting method to minimize the error of fit between the approximating B-spline surface and approximation-mesh.

The gridded data surface fitting problem is framed in the form of an over-determined linear system of equations.

Since the least squares approximation minimizes the error of the solution in an over-determined linear system of equations, we have chosen a least squares approximation strategy to solve our surface fitting problem.

Least Squares Surface Fitting

Least square fitting to the approximation-mesh is accomplished in two steps.

1. Assign parameter values to the spring points.
2. Perform a gridded data fit to the spring points.

Parameter value assignment is a trivial operation since the approximation-mesh is a regular grid. Values are assigned by stepping uniformly in parameter space as we move from one iso-curve to the next.

There are two notable facts about this fitting procedure. First, according to our computation the error of the least squares fit is not the cumulative closest distance of every spring point to the B-spline surface. Instead, it is the cumulative distance of each spring point to that point on the fitted spline surface which has the same parameter value, i.e., it is the cumulative parametric distance of the spring points to the fitted B-spline surface. The mathematical expression for this error term is:

$$E_{param\text{-}dist} = \sum_i \sum_j (\|\text{Spring}(u_i, v_j) - \text{Spline}(u_i, v_j)\|)^2$$

We call this error the parametrc distance error. An intuition for the parametric distance error for the simpler case of a curve is provided by FIG. 16.

A more traditional method for measuring the error of fit is the closest distance error. Since the closest distance of a point to a surface is measured along the normal to the surface this error is also known as the normal distance error. It is given by the expression:

$$E_{normal\text{-}dist} = \sum_i \sum_j (\|\text{Spring}(u_i, v_j) - D_{Spline}(\text{Spring}(u_i, v_j)\|)^2$$

where $D_{Spline}(\text{Spring}(u_i, v_j)$ is a function that returns for each spring point, the closest point from that spring point to the spline surface. The difference between parametric and normal distance error is illustrated for a one dimensional case in FIG. 16. It is worth noting that parametric distance error is an upper bound on the normal distance error. Thus, if we can make our parametric error small enough, the normal error must be smaller.

Figure 16:
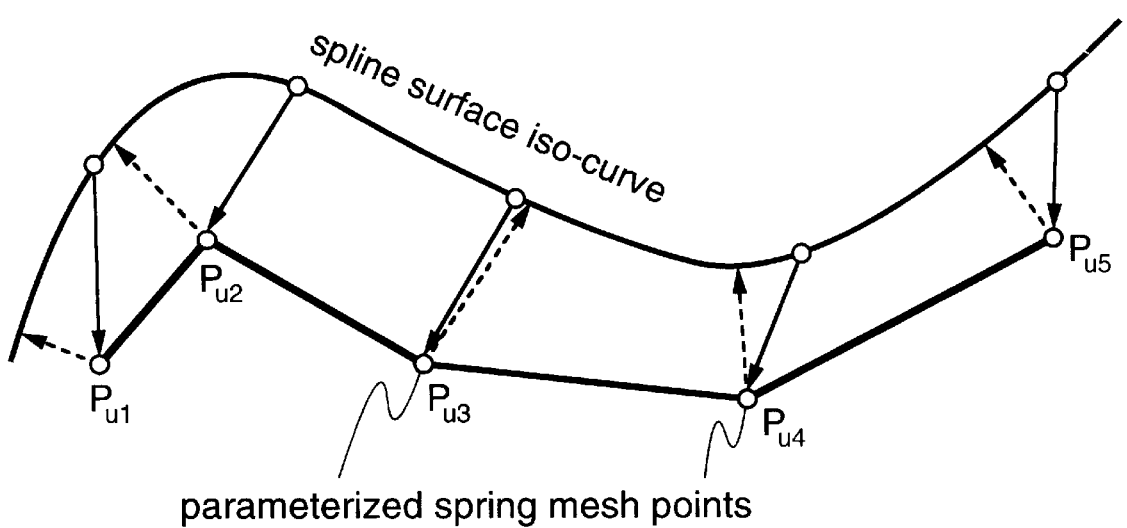
FIG. 16 illustrates the difference between parametric and normal distance error used for surface fitting.

The error of our fit is measured as a sum of the magnitudes of the parametric error vectors (shown as solid arrows in FIG. 16). An alternative error metric is the normal distance error metric. This is measured as a sum of the magnitude of vectors from a spring point to the closest point on the spline surface (shown as dotted arrows in FIG. 16). Note that normal distance error computation can be expensive since it requires a search in parameter space for the closest point on the spline surface to the spring point.

A second notable property of our fitting procedure (that arises out of the first one) is that our least squares fitting procedure minimizes the cumulative parametric distance error only for a given parameterization of the approximation-mesh. What this translates to is the fact that once we fix a parameterization of the spring points, our fitting procedure minimizes the parametric distance error. However, it does not guarantee that there is no other parameterization of the spring points which could result in a smaller parametric distance error.

This fitting methodology (for fitting to regular gridded data) is an efficient operation and produces B-spline surfaces that closely follow both the geometry and the parameterization of the underlying approximation-mesh.

If one wanted to attempt a solution that did indeed minimize the nonnal distance error, one possible method could be to refine the parameter values of the spring points using an iterative strategy. The iteration would alternate between re-parameterizing our spring points based on an intermediate B-spline fit and re-fitting the B-spline surface based on the re-parameterized spring points. Note that since the approximation-mesh is a regular grid and since we have chosen to use gridded data fitting, each spring point along a u (or v) iso-curve must be assigned the same u value (or v) value. Therefore an iteration that re-assigns parameter values to spring points must assign the same iso-parametric value for entire iso-curves rather than just individual spring points. In the context of our pipeline, any such fitting strategy would have to address the problem of following the feature curves (and in general preserving the parameterization of the approximation-mesh).

Results

In summary, we fit B-spline surfaces directly to the approximation-mesh generated by our parameterization strategy. This fitting method has three main advantages.

First, since the approximation-mesh is a regular grid, the least squares fitting process is both rapid and numerically robust even for large approximation-meshes.

Second, since the approximation-mesh accurately re-samples the original polygonal patch, the B-spline surfaces produced by our fitting procedure are of a high quality.

Third, because of the speed of the gridded data fitting process, the user can ask to change the resolution of the fitted B-spline surface and the system responds at interactive rates with the fitted results.

It is worth noting that we may use our B-spline surface fitting techniques to capture both the coarse and fine geometry of the underlying polygonal surface (e.g., with a spline surface). However, as discussed earlier we represent the fine detail in our models as displacement maps. In the next section below we explain how displacement maps can be computed from our polygonal models.

DISPLACEMENT MAPS

Using the techniques described above, it is possible to capture the entire geometry of a polygonal model in the form of B-spline surfaces. However, we choose to separate the representation of coarse geometry and fine surface detail. We fit our polygonal models with a hybrid representation of B-spline surface patches and associated displacement maps. Our hybrid representation has several desirable properties.

The fine geometric detail in a model is usually of little significance during the modeling and animation of the coarse geometry of the model. Rather its principal use is in enhancing the appearance of the model at rendering time. Furthermore, its presence at the modeling (or animation) stage of an application may degrade the time or memory performance of an interactive system.

For example, various different resolutions of a B-spline surface may be fit to a patch. A low-resolution B-spline surface patch captures just the coarse geometry of the original polygonal patch while a high-resolution B-spline surface captures the fine surface detail as well. While the denser patch improves on capturing the fine geometric detail in the original mesh, it does so at the expense of a considerable increase in control vertex density. This makes it unwieldy to manipulate and expensive to maintain within an interactive application. In general, a dense smooth surface representation that includes fine geometric detail is of little use for most interactive modeling or animation applications. However, it is desirable to retain the fine geometric detail in our original data so that it may be used at rendering time to enhance the appearance of the model.

Compared to a dense smooth surface, our hybrid representation of smooth surface and displacement map allows a user to effectively separate coarse geometry (which can be used for interactive modeling and animation applications), from fine surface detail (which can be used to enhance surface appearance at rendering time). Our proposed separation of geometry into smooth surfaces and displacement maps can be used with arbitrary smooth surface representations.

Furthermore, since our displacement maps are essentially images, they can be processed, re-touched, compressed, and otherwise manipulated using simple image processing tools. This is a flexible and intuitive paradigm for manipulating fine geometric detail compared to the cumbersome interface offered by a smooth surface representation for this purpose. For example, to edit a bump or a crease with a B-spline surface, a user would have to first identify the control vertices that controlled that particular bump or crease then manipulate it by pulling and pushing control vertices in 3-space. In contrast, with a displacement map image the user can edit surface detail with any standard 2-D image painting tool. We demonstrate this flexibility of our hybrid representation through several examples.

A variant of our approach to solving the inherent limitations of smooth surfaces for representing surface detail might be to use hierarchical basis functions such as hierarchical splines or wavelet based splines. While these bases offer a more compact means of representing complex smooth surfaces than uniform B-splines, the interface used to manipulate surface detail is cumbersome, i.e., the manipulation of control vertices in three space. Therefore, while hierarchical smooth surface representations are reasonable alternatives to a B-spline surface representation for representing coarse geometry, they suffer from many of the same disadvantages that a uniform B-spline basis does for representing and manipulating fine geometric detail. We chose the B-spline basis function as our representation for coarse geometry over other parametric (including the above-mentioned hierarchical) representations because of its popularity in the CAD and animation industries.

The remainder of this discussion is organized as follows. We begin by defining a general mathematical formulation of a displacement map. Then we discuss how a displacement map is computed based on our input data and approximating B-spline surface. We compute our displacement maps as vector functions and store them as color images. While vector displacement maps are useful for a variety of operations, some operations such as (displacement image) painting are more intuitive on gray-scale images. We discuss then some methods of extracting a gray-scale image from our displacement maps. For some applications bump maps are preferable to displacement maps for representing coarse geometry. These are functions that change the appearance of a surface without changing its geometry. We also discuss how bump maps can be computed from our input data. Then we explain one limitation of our least squares surface fitting strategy as it relates to displacement map computation.

Definitions

A displacement map on a surface is a function, usually defined on the domain of definition of the surface, that perturbs the position of each point on that surface. Displacement maps are widely used at rendering time to add geometrically interesting detail to smooth surfaces. They are available in several commercial renderers such as Pixar's Renderman system and Softimage's MentalRay renderer.

A displacement map can either be a scalar function or a vector function. In our discussions we use both formulations. We use the following formulation for a vector displacement map on a bivariate parametric surface F ($F:\mathbb{R}^2 \to \mathbb{R}^3$):

A vector displacement map is a function $D:\mathbb{R}^2 \to \mathbb{R}^3$ that, given an arbitrary point ($u_0$, $v_0$) in parameter space, returns a vector perturbation $D(u_0, v_0)$ (or displacement) of the surface point $F(u_0, v_0)$.

With this definition, the displacement mapped surface is given by new function $$F_{disp}:\mathbb{R}^2 \to \mathbb{R}^3$$

defined by $$F_{disp}(u,v) = F(u,v) + D(u,v)$$

for every (u, v) in parameter space. Note that since there is no restriction on the directions of the vector displacements, the surface reconstructed by a vector displacement map over a planar surface is not constrained to be a height field. It may even self-intersect.

Scalar displacement maps are usually interpreted as being along the surface normal. A scalar displacement map is a function $D:\mathbb{R}^2 \to \mathbb{R}$ that, given an arbitrary point ($u_0$, $v_0$) in parameter space, returns a scalar displacement $D(u_0, v_0)$ of the surface point $F(u_0, v_0)$ along the normal to surface at ($u_0$, $v_0$). The displacement mapped surface $F_{disp}$ is given by:

$$F_{disp}(u,v) = F(u,v) + D(u,v)\hat{N}(u,v)$$

where $\hat{N}$ (u, v) represents the surface normal at F(u, v). In contrast to vector displacement maps, scalar displacement maps over a planar surface are constrained to be height fields. Therefore the geometry that can be modeled with scalar displacement maps is inherently limited.

In our system, the obvious displacement function relates points on the fitted spline surface to points on triangles of the original polygon mesh. However, computing such a function (whether scalar or vector) requires computing the closest point (or a perpendicular projection) on the unparameterized polygon mesh from a point on the spline surface. This is an expensive operation. Furthermore, our fitting procedure is premised on the assumption that the spring mesh is a faithful representation of the original polygon mesh. Therefore, we find it sufficient to define a displacement function that relates points on the spline surface to points on the parameterized spring mesh surface.

Vector Displacement Maps

Even given the simplification of computing displacement maps based on the parameterized spring mesh, computing a scalar displacement maps is error prone. This is because the computation involves using a perpendicular projections from the spline surface to the spring mesh. This computation can fail catastrophically if the spring mesh curves sharply away from the surface. Furthermore, a scalar displacement map by its very definition cannot represent a displacement map that is not a height field over the surface. Therefore, if the displacement map is not a height field, perpendicular projection will always result in an incorrect displacement map, i.e., one that leads to an incorrect reconstruction of the surface detail. FIGS. 17A–B illustrate the problems associated with straightforward perpendicular projection. FIG. 17A illustrates the computation of a scalar displacement map on an iso-curve of the spline surface. The computation involves perpendicular projection from a set of points on the spline surface to the spring mesh. Note that in general, this is a non-robust computation. For example, the leftmost normal vector from the spline surface does not intersect the spring mesh surface. More importantly, note that a reconstruction of the displacement mapped spline surface based on the displacement vectors will always be incorrect. Specifically, the reconstruction misses the overhangs from the bump in the middle of the spring mesh. This occurs because scalar displacement maps can correctly reconstruct only height fields and the spring mesh shown is not a height field over the spline surface. We can avoid the problems with perpendicular projection simply by defining displacements as offsets to vertices of the spring mesh from corresponding points on the spline surface. Recall that there is a natural association of the spring mesh points to parameter values: these are the same parameter values that were used for the surface fitting step. Note that the offset from a point on the spline surface to the corresponding point on the spring mesh is in general a vector. Computing one such (displacement) vector offset for each spring point gives us a regular grid of displacement vectors at the resolution of the spring mesh. FIG. 17B illustrates our computation of a vector displacement map on the same set of iso-curves. Note that the displacement vectors are all well-defined and correctly reconstruct the original spring mesh.

We represent each of these displacement vectors in the local coordinate frame of the spline surface, i.e., we store the displacement offsets relative to the underlying spline surface. For applications that modify the underlying B-spline surface (such as animation), this choice of coordinate frames allows the displacements to move and deform relative to the surface. In general, this representation is useful for any application that stores displacement map independent of underlying surface topology.

Since our B-spline basis functions are continuously differentiable (i.e., $C^2$) so is our underlying fitted B-spline surface. Therefore, a local coordinate frame for the spline surface is easily computed by evaluating at each (u, v) position, the two surface partials U and V and the surface normal N. This frame varies for every point (u, v) in parameter space and is given by:

$$U(u,v)=\partial F(u,v)/\partial u$$

$$V(u,v)=\partial F(u,v)/\partial v$$

$$N(u,v)=U\times V$$

Given this coordinate frame, the (vector) displacement D at a point P(u,v) is given by:

$$D=(D\cdot U)U+(D\cdot V)V+(D\cdot N)N$$

From an implementation standpoint care needs to be taken when evaluating the local frame of reference at singular points of the surface (e.g., when all the control vertices of a boundary curve are coincident). We refer the reader to any standard book on parametric surfaces for further details on the robust computation of surface partials.

Since our vector displacements, as computed, are a regular grid of 3-vectors, they can conveniently be represented in the form of an rgb image. Our displacement map D(u, v) is therefore given by a reconstruction from this regular grid of displacement vectors. As such, any standard image reconstruction filter suffices for this purpose. We have used a bilinear filter reconstruction for the examples shown in this thesis.

Note that the displacement map as computed here is essentially a re-sampled error function since it represents the difference of the positions of the spring points from the spline surface. Our displacement map is a reconstruction of the parametric distance error field.

Our image representation of displacement maps permits the use of a variety of image-processing operations such as painting, compression, scaling and compositing to manipulate fine surface detail.

Scalar Displacement Maps

While vector displacement maps are useful for a variety of operations, some operations such as (displacement image) painting are more intuitive on gray-scale images. There are several methods of arriving at a scalar displacement image. One method to arrive at this scalar image might be to compute a normal offset from the spline surface to the spring mesh. However, as discussed earlier, this method is both expensive and prone to non-robustness in the presence of high curvature in the spring mesh.

Instead we have used two alternative formulations. The first computes and stores at each sample location (or pixel) the magnitude of the corresponding vector displacement. In this case, modifying the scalar image scales the associated vector displacements along their existing directions. A second alternative, stores at each sample location the component of the displacement vector normal to the spline surface (i.e., D·N). Modifying the scalar image therfore changes only the normal component of the vector displacement. Each of these representations offers a different interaction with the displacement map.

Bump Maps

A bump map is defined as a function that performs perturbations on the direction of the surface normal before using it in lighting calculations. In general, a bump map is less expensive to render than a displacement map since it does not change the geometry (and occlusion properties) within a scene but instead changes only the shading. Bump maps can achieve visual effects similar to displacement maps except in situations where the cues provided by displaced geometry become evident such as along silhouette edges. We compute bump maps using techniques very similar to those used for computing displacement maps: at each sample location instead of storing the displacement we store the normal to the corresponding spring mesh point. Thus the bump map is simply expressed as:

$$N_{Spline}(u,v)=N_{spring}(u,v)$$

As before $N_{spring}$ is stored in the local coordinate frame of the spline surface. Since the bump map, as computed, is also a regular grid of 3-vectors it can be stored as an rgb image as well. Another limitation of bump maps is that while they can fake fine surface detail fairly convincingly, it is much harder to represent coarse geometry with them.

Note that an alternate method to obtain the bump map is to compute it from the displacement map image. The original bump map formulation is equivalent to our method because the displacement mapped spline surface is just the spring mesh. Therefore a bump map that is extracted from the displacement map would yield the same result as one that is extracted from our spring mesh.

Results

To summarize: displacement maps are computed as the (pararnetric) error between the spline surface and spring mesh re-sampled into a regular grid. Displacement maps provide a useful method for storing and manipulating fine surface detail in the form of displacement map images. We have found that this representation empowers users to manipulate geometry using tools outside our modeling system. Displacement maps are useful in various different ways that demonstrate the flexibility of our hybrid representation. Many useful applications of the techniques of the present invention would have been difficult (i.e., manually intensive) to duplicate with prior art techniques. For example, the techniques of the present invention also allow for the simple transferring of displacement maps between objects having different large-scale surface shapes. In another example, the combination of spline and displacement map representations at various resolutions can be used to allow easy editing of geometry at different resolution scales. One can edit the fine geometry of a surface using a simple paint program to alter the displacement map. Applying this edited image to the spline then gives us a resurfacing of the object. Operations such as these can be extended so that multiple levels of displacement map can essentially provide an image filter bank for geometry, i.e., an alternative multi-resolution surface representation based on images. Note, however, that the images are offsets from different surfaces and the displacements are in different directions, so they cannot be combined using simple arithmetic operations.

APPLICATIONS

Algorithms and practical tools for converting dense polygonal meshes to smooth surfaces have applications in a number of fields including entertainment, industrial design, reverse engineering, the web, medicine, and manufacturing.

Entertainment

Three dimensional models in movies, games and broadcast television programs use smooth surfaces or structured polygonal meshes (which are easily derived from smooth surfaces). Artists in this domain often sculpt physical maquettes of intended 3-D computer models to define the unique characteristics of the model and to get a better intuition for the model's shape. Current practice in this industry consists of employing touch probes and similar manual techniques to input these models into the computer. Not surprisingly, these processes are tedious and time-consuming. For these domains, the ability to create smooth surface models from laser scanned physical objects offers a quick and powerful alternative for model creation.

Industrial Design

Designers in the industrial design community use parametric surfaces (almost exclusively) to create the exterior skin of consumer products such as audio speakers and perfume bottles. A large subset of this community consists of car styling applications. In this case, both the interior and exterior of cars are often built as physical mockups. Subsequently, time consuming processes such as touch probing are used to create computer models from the physical mockups. In these and similar domains, the ability to create complex smooth surface models from physical models has the potential of cutting design time and permitting the creation of models of a greater complexity than is possible using current methods.

Reverse Engineering and Inspection

Techniques that convert scanned data to smooth surfaces have obvious applications in reverse engineering. Specific examples include verifying the dimensions of parts against existing computer models and creating computer models of parts for which no such models yet exist. Interestingly, the laser scanning of objects is becoming increasingly common in this domain. Unfortunately, existing software tools that process the resulting data tend to have limited functionality and are usually manually intensive.

Medicine

In the medical industry, Computer Tomography (CT) and Magnetic Resonance Imaging (MRI) technologies are currently used to create both volumes and dense polygonal meshes from sequences of cross-sectional data. These computer models are employed mainly for visualization and diagnosis purposes. To enable the use of these models for a wider range of applications, such as the finite element analysis of bone structure or soft tissue deformation analysis, they must be converted to smooth surface representations.

Manufacturing

Certain manufacturing technologies such as CNC milling require smooth surface descriptions in order to produce high quality output. These technologies are widely used in industries such as manufacturing of car body exteriors, mechanical parts, toys, consumer goods etc. The ability to convert dense polygonal models to smooth surfaces permits the manufacture of these objects using these sophisticated manufacturing technologies.

Anthropometry and Clothing

With the advent of high accuracy, rapid full-body laser scanners such as Cyberware Inc.'s Wide Body Scanner it is now possible to digitize human shape at 1–2 mm resolution. This data if used in the context of anthropometry (measurement of humans) could have profound implications in a number of different domains. One example is the fashion industry where custom fit clothes could be created from the digital dataset of a human. The techniques explained in the previous sections could be effectively used to extract complex body measurements, e.g., where only some parts of a curve or surface that is being used for measurement must maintain fidelity of fit to the surface. They could also be used to effectively design custom fit clothes on the digital data. Our methods for controlling fidelity to the underlying surface could be an effective method for controlling the closeness of fit of the clothing to the body.

VARIATIONS AND ALTERNATE EMBODIMENTS

There are a number of ways in which details of the above description may be varied without departing from the scope of the invention. For example, based on the teachings of the present invention, those skilled in the art will be able to implement variations of the above embodiments in the following ways:

Improving robustness in the presence of holes in the mesh.

Adding the ability to create triangular parameterizations and patches.

Creating adaptive spring grids for sampling decimated meshes.

Adding tools for fitting to the original mesh vertices.

Allowing variable knot density in our B-spline surfaces.

Using alternative smooth surface representations such as hierarchical splines or wavelets.

In principle, the approach of the present invention may be used to create an approximating surface for an entire model based on just a small collection of user specified surface curves (i.e., the curves do not have to create a patch network). Such an approximating technique could be useful for those applications where specifying the entire network of smooth surface boundary curves is not crucial, rather the only requirement is that the surface conform to a small set of potentially disconnected feature curves. Techniques in the free-form design literature have attempted such techniques but only for very small data sets. Our is feature drive parameterization algorithms may be thought of as a finite difference solution to a variational parameterization problem restricted to a dense polygonal patch.

What is claimed is:

1. In a 3-D computer graphics system, a computer-implemented method for fitting a smooth surface to an input surface, the method comprising:
   a) dividing the input surface into patches;
   b) generating parameterizations of the patches, wherein the parameterizations minimize a discretized higher order energy functional defined on the input surface; and
   c) fitting smooth surfaces to the patches, wherein the smooth surfaces are derived from the generated parameterizations,
      wherein generating the parameterizations and fitting the smooth surfaces are independently controlled.

2. The method of claim 1 wherein the fitting comprises an approximate fitting of the smooth surfaces to the patches such that a fidelity of the approximate fitting is controlled independent of the generated parameterizations.

3. The method of claim 2 wherein the fidelity of the approximate fitting is locally controlled.

4. The method of claim 1 wherein the parameterizations comprise spring mesh iso-curves on the surface patches, and wherein fitting smooth surfaces comprises generating approximation spring meshes approximately coinciding with the surface patches and fitting spline surfaces to the approximation spring mesh.

5. The method of claim 4 wherein a locally controlled surface fidelity determines displacements between the approximation spring meshes and the surface patches.

6. The method of claim 4 wherein fitting the spline surfaces to the approximation spring mesh minimizes a parametric distance error of fit.

7. The method of claim 1 wherein generating parameterizations of the patches comprises minimizing the discretized higher order energy functional subject to a constraint that iso-curves of the parameterization are attracted to follow a feature curve.

8. The method of claim 7 wherein the feature curve is specified from user-interactive input.

9. The method of claim 1 wherein generating parameterizations of the patches comprises subjecting sub-patches of the parameterizations to predetermined criteria that propagate across iso-curves of the parameterizations.

10. The method of claim 9 wherein the predetermined criteria comprise an arc length uniformity criterion, an aspect ratio uniformity criterion, and a parametric fairness criterion.

11. A computer-implemented method for fitting a smooth parameterized surface to an input surface patch, the method comprising:
   a) generating a mapping M into $\mathbb{R}^3$ from a parameter space region I in $\mathbb{R}^2$ wherein an image surface M(I) substantially coincides with the surface patch, and wherein a parameterization of M minimizes a discretized energy functional defined on the patch; and
   b) generating from M a mapping M' into $\mathbb{R}^3$ from the parameter space region I in $\mathbb{R}^2$, wherein an image surface M'(I) approximately fits the surface patch, while a parameterization of M' substantially coincides with the parameterization of M;
      wherein the parameterization of M and the fit of M'(I) to the surface patch are independently controlled.

12. The method of claim 11 wherein the image surface M'(I) approximately fits the surface patch in accordance with a surface fidelity controlled independent of the generated parameterizations.

13. The method of claim 12 wherein the surface fidelity is locally controlled.

14. The method of claim 11 wherein the mapping M comprises spring mesh iso-curves, and wherein generating M' comprises generating an approximation spring mesh approximately coinciding with the surface patch and fitting a spline surface to the approximation spring mesh.

15. The method of claim 14 wherein a locally controlled surface fidelity determines displacements between the approximation spring mesh and the surface patch.

16. The method of claim 14 wherein fitting the spline surface to the approximation spring mesh minimizes a parametric distance error of fit.

17. The method of claim 11 wherein generating the mapping M comprises minimizing the discretized higher order energy functional subject to a constraint that iso-curves of the parameterization are attracted to follow a feature curve on the patch.

18. The method of claim 17 wherein the feature curve is specified from user-interactive input.

19. The method of claim 11 wherein generating the mapping M comprises subjecting sub-patches of the parameterization to predetermined criteria that propagate across iso-curves of the parameterization.

20. The method of claim 19 wherein the predetermined criteria comprise an arc length uniformity criterion, an aspect ratio uniformity criterion, and a parametric fairness criterion.

* * * * *